(12) United States Patent
Wong et al.

(10) Patent No.: US 11,747,572 B2
(45) Date of Patent: Sep. 5, 2023

(54) REVERSIBLE POLARITY FIBER OPTIC CONNECTOR

(71) Applicant: Senko Advanced Components, Inc., Marlborough, MA (US)

(72) Inventors: Yim Wong, Kowloon (HK); Siu Kei Ma, Kowloon (HK); Kazuyoshi Takano, Tokyo (JP)

(73) Assignee: Senko Advanced Components, Inc, Hudson, MA (US)

( * ) Notice: Subject to any disclaimer, the term of this patent is extended or adjusted under 35 U.S.C. 154(b) by 217 days.

(21) Appl. No.: 16/953,686

(22) Filed: Nov. 20, 2020

(65) Prior Publication Data
US 2021/0149120 A1   May 20, 2021

Related U.S. Application Data

(60) Provisional application No. 63/072,313, filed on Aug. 31, 2020, provisional application No. 62/938,117, filed on Nov. 20, 2019.

(51) Int. Cl.
*G02B 6/38* (2006.01)

(52) U.S. Cl.
CPC ......... *G02B 6/3831* (2013.01); *G02B 6/3851* (2013.01); *G02B 6/3885* (2013.01); *G02B 6/3893* (2013.01)

(58) Field of Classification Search
CPC ........................................................ G02B 6/38
USPC ............................................................. 385/71
See application file for complete search history.

(56) References Cited

U.S. PATENT DOCUMENTS

| 9,684,130 | B2 * | 6/2017 | Veatch ............... | G02B 6/2726 |
| 9,829,645 | B2 | 11/2017 | Nexans | |
| 10,228,516 | B2 * | 3/2019 | Veatch ............... | G02B 6/3831 |
| 2001/0026661 | A1 * | 10/2001 | de Jong ............. | G02B 6/3831 |
| | | | | 385/56 |
| 2018/0088288 | A1 * | 3/2018 | Taira .................. | G02B 6/3885 |
| 2019/0154922 | A1 * | 5/2019 | Elen .................... | G02B 6/3878 |

FOREIGN PATENT DOCUMENTS

JP             6173629 B1 *  8/2017  .......... G02B 6/2726

OTHER PUBLICATIONS

International Search Report and Written Opinion of PCT/US20/61591, dated Feb. 26, 2021, 16 pages.
International Search Report and Written Opinion, Application No. PCT/US20/61591, dated Feb. 26 2021, pp. 10.

* cited by examiner

*Primary Examiner* — Kaveh C Kianni

(57) ABSTRACT

A reversible polarity fiber optic connector includes an outer housing including a polarity key for coupling the outer housing to a fiber optic receptacle in only one orientation. A ferrule assembly is received in the outer housing in a first position corresponding to a first polarity of the fiber optic connector and in a second position corresponding to a second polarity of the fiber optic connector. The ferrule assembly forms an optical connection with the fiber optic receptacle. A boot assembly is releasably connected to the outer housing to enable the ferrule assembly to be inserted into and removed from the outer housing. The boot assembly includes a rotor rotatable between locked and release positions. The rotor includes a blocking portion to block disconnection of the boot assembly with the outer housing in the locked position and to permit disconnection of the boot assembly with the outer housing in the release position.

17 Claims, 19 Drawing Sheets

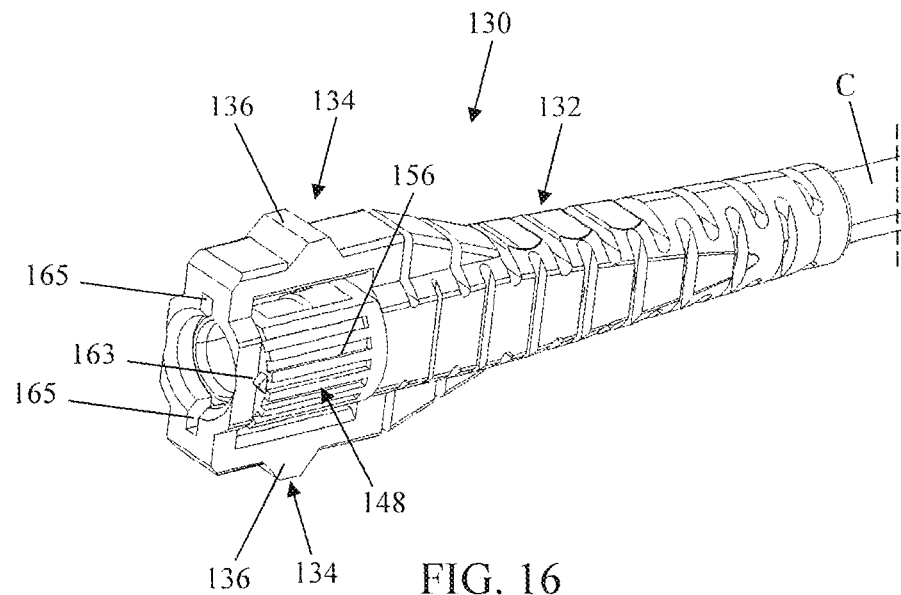
FIG. 16
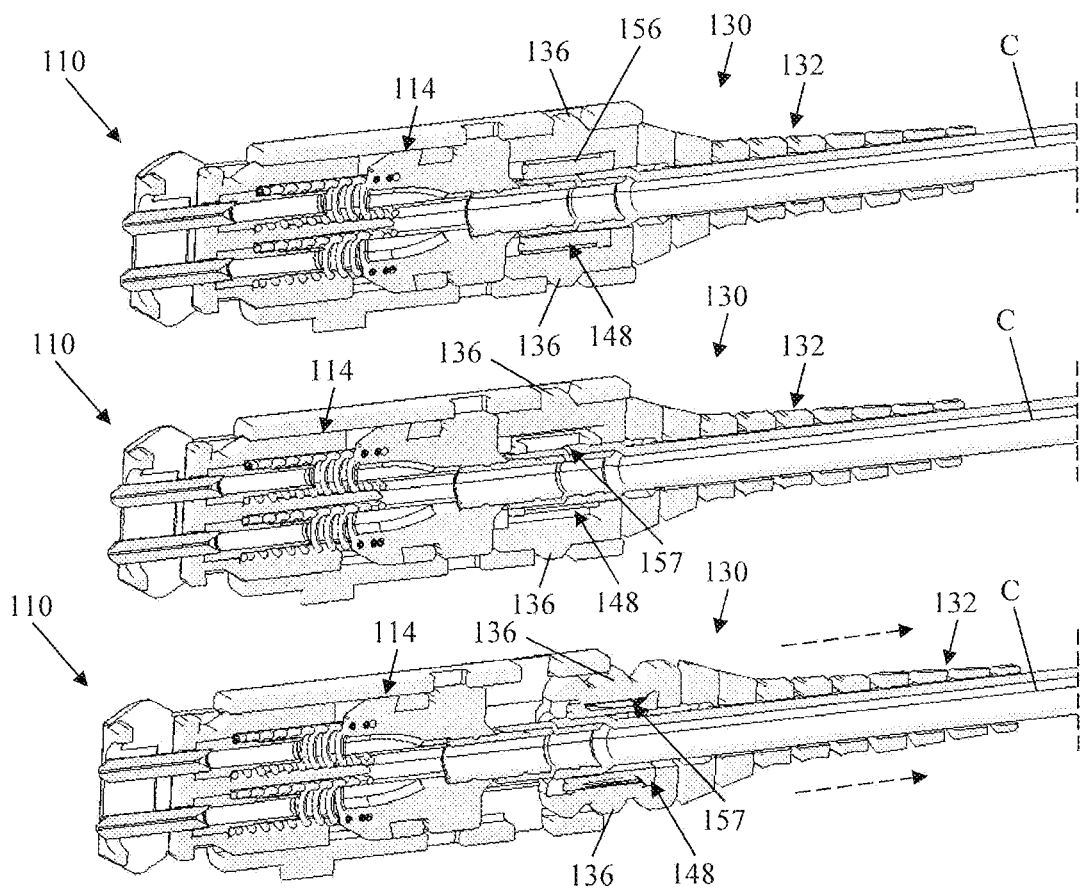
FIGS. 17A-C

FIGS. 30A-C

REVERSIBLE POLARITY FIBER OPTIC CONNECTOR

CROSS-REFERENCE TO RELATED APPLICATIONS

This application claims priority to U.S. Provisional App. No. 62/938,117, filed Nov. 20, 2019, and U.S. Provisional App. No. 63/072,313, filed Aug. 31, 2020, the entireties of which are hereby incorporated by reference.

FIELD

The present disclosure generally relates to a fiber optic connector, and, more specifically, to a reversible polarity fiber optic connector.

BACKGROUND

Optical connectors are used within optical communication networks to interconnect optical cables to optical devices or other optical cables. Optical connections typically involve two optical connectors connected together. In fiber optic connectors where more the one fiber ferrule is present, it can be important to control the orientation of the optical connector so that the proper connections are made when the optical connector plugs into an optical receptacle. Therefore, optical connectors are constructed to be connected in only one orientation to the optical receptacle. This selected orientation can be referred to as establishing a polarity of the connector.

SUMMARY

In one aspect, a reversible polarity fiber optic connector comprises an outer housing having a front end and a rear end separated along a connection axis. The outer housing includes a polarity key configured for engaging a fiber optic receptacle to permit coupling of the outer housing in only one orientation with respect to the fiber optic receptacle. A ferrule assembly includes a front body, a first ferrule and a second ferrule. The first and second ferrules are supported by the front body. The ferrule assembly is configured for mating reception in the outer housing in a first position corresponding to a first polarity of the fiber optic connector and in a second position corresponding to a second polarity of the fiber optic connector. The first and second ferrules project from the front end of the outer housing in both the first and second positions. The ferrule assembly is configured to form an optical connection with the fiber optic receptacle. A boot assembly is releasably connected to the outer housing to enable the ferrule assembly to be inserted into the outer housing along the connection axis and to enable the ferrule assembly to be removed from the outer housing along the connection axis when the boot assembly is disconnected from the outer housing. The boot assembly includes a rotor operatively connected to the outer housing for rotation with respect to the outer housing about the connection axis between a locked positon and a release position. The rotor includes a blocking portion. The blocking portion is configured to block disconnection of the boot assembly with the outer housing in the locked position, and is configured to permit disconnection of the boot assembly with the outer housing in the release position.

In another aspect, a reversible polarity fiber optic connector comprises an outer housing having a front end and a rear end separated along a connection axis. The outer housing includes a polarity key configured for engaging a fiber optic receptacle to permit coupling of the fiber optic connector in only one orientation with respect to a fiber optic receptacle. A ferrule assembly is received in the outer housing and is configured to form an optical connection with the fiber optic receptacle. A boot assembly is releasably coupled to the outer housing to enable the ferrule assembly to be inserted into the outer housing along the connection axis and to enable the ferrule assembly to be removed from the outer housing along the connection axis when the boot assembly is disconnected from the outer housing. The boot assembly includes a hook configured to engage the outer housing to secure the boot assembly to the outer housing. The boot assembly is rotatable relative to the outer housing between a locked position where the hook engages the outer housing to secure the boot assembly to the outer housing and a release position where the hook is detached from the outer housing to permit the boot assembly and ferrule assembly to be separated from the outer housing.

Other objects and features of the present disclosure will be in part apparent and in part pointed out hereinafter.

BRIEF DESCRIPTION OF THE DRAWINGS

FIG. 16 is a perspective of the boot assembly of the fiber optic connector of FIG. 13, with the rotor of the boot assembly in a release position;

FIG. 17A is a cross section of the fiber optic connector of FIG. 13, with the rotor in the locked position;

FIG. 17B is a cross section of the fiber optic connector of FIG. 13, with the rotor in the release position;

FIG. 17C is a cross section of the fiber optic connector of FIG. 13, with the boot assembly being removed from an outer housing of the fiber optic connector;

Corresponding reference characters indicate corresponding parts throughout the drawings.

DETAILED DESCRIPTION

Figure 1:
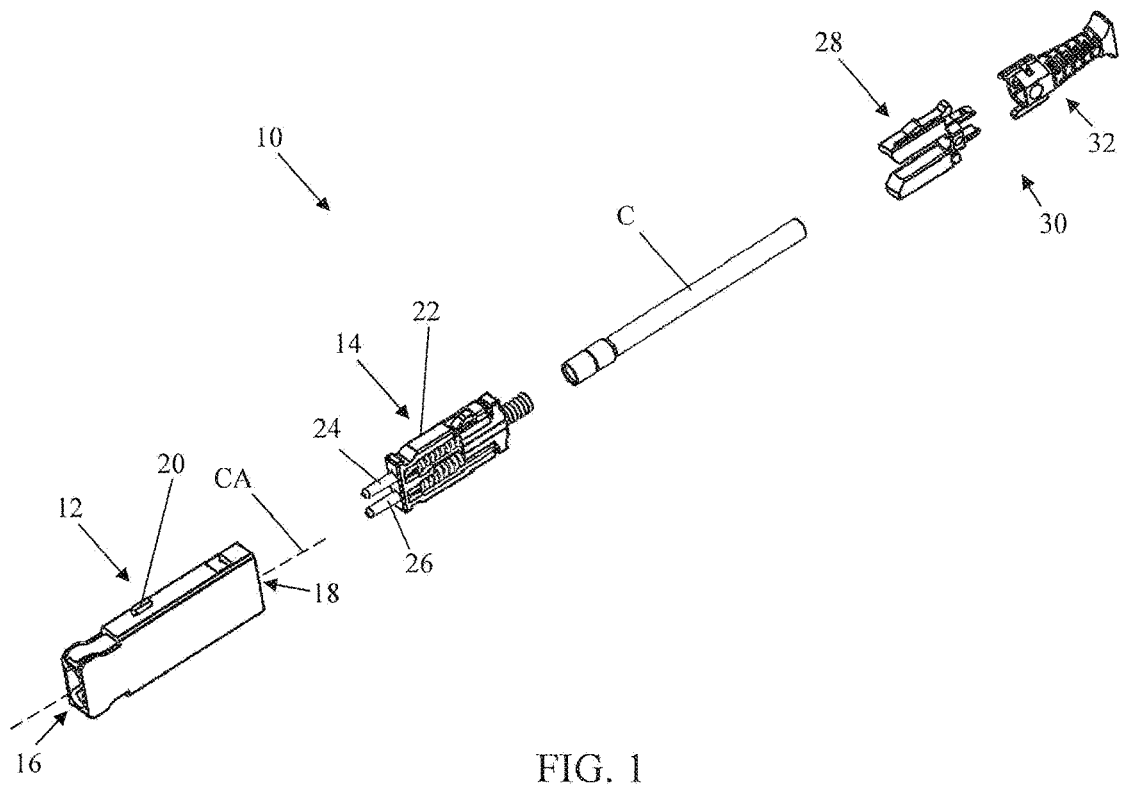
FIG. 1 is an exploded perspective from a forward vantage of a fiber optic connector according to one embodiment of the present disclosure.
Figure 2:
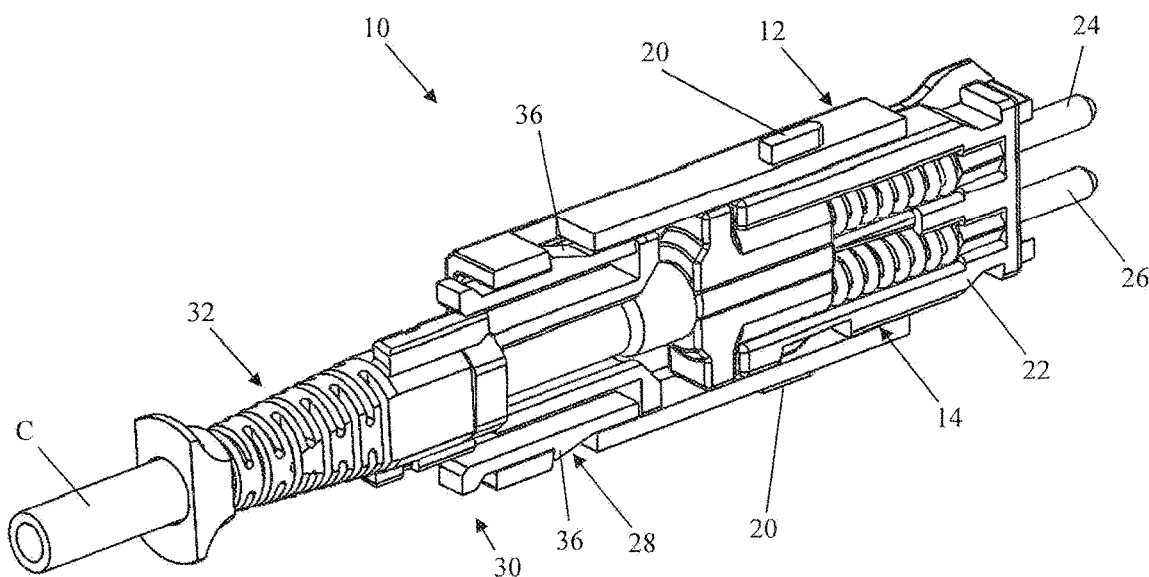
FIG. 2 is a perspective from a rearward vantage of the assembled fiber optic connector, with a portion of an outer housing removed to show internal construction.
Figure 3:
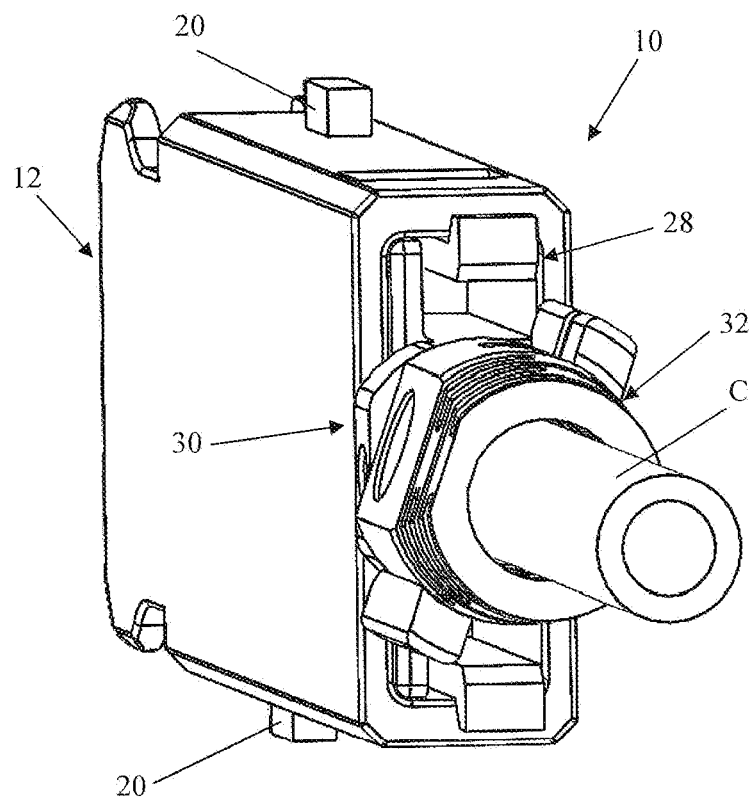
FIG. 3 is a rear perspective of the fiber optic connector with a rotor in a release position.

Referring to FIGS. 1-3, a fiber optic connector according to one embodiment of the present disclosure is generally indicated at reference numeral 10. The fiber optic connector is constructed to form a fiber optic connection with a fiber optic receptacle (not shown). The fiber optic receptacle can be any suitable receptacle, such as another fiber optic connector, a fiber optic adapter, etc., for connecting with the fiber optic connector 10. When coupled to the fiber optic receptacle, the fiber optic connector 10 and fiber optic receptacle form an optical connection that enables communication between different fiber optic components (e.g., cables, devices, etc.) in an optical communications network. The fiber optic connector 10 is attached to an end of a fiber optic cable C (an outer jacket of which is shown in FIGS. 1-3), although other arrangements are within the scope of the present disclosure. In the illustrated embodiment, the fiber optic connector 10 is a male fiber optic connector configured to mate with (e.g., be inserted in) the female fiber optic receptacle. Other configurations of the fiber optic connector 10 are within the scope of the present disclosure. For example, the fiber optic connector 10 can be a female fiber optic connector configured to mate (e.g., receive) a male fiber optic receptacle. In another example, the connector could make electrical or other types of connections instead of or in addition to an optical connection. The fiber optic connector 10 is a reversible polarity fiber optic connector that enables the polarity of the fiber optic connector to be changed.

The fiber optic connector 10 includes an outer housing 12 and a ferrule assembly 14. The outer housing 12 has a front or distal end 16 and a rear or proximal end 18 separated along a connection or longitudinal axis CA (FIG. 1). The outer housing 12 defines an interior sized and shaped to receive and hold the ferrule assembly 14 (FIG. 2). The interior extends between the front and rear ends 16, 18 (e.g., the interior is open ended). The outer housing 12 is configured to couple to (e.g., mate with) the fiber optic receptacle. The outer housing 12 includes polarity keys 20 configured to engage the fiber optic receptacle to permit coupling of the outer housing in only one orientation with respect to the fiber optic receptacle. Accordingly, the fiber optic connector 10 can only be coupled to the fiber optic receptacle in one orientation.

The ferrule assembly 14 is configured to form an optical connection with the fiber optic receptacle. The ferrule assembly 14 includes a front body 22, a first ferrule 24 and a second ferrule 26. The first and second ferrules 24, 26 are supported by the front body 22. One or more optical fibers (not shown) of the fiber optic cable C are attached to each ferrule 24, 26. The first and second ferrules 24, 26 are configured to engage (e.g., mate with) the fiber optic receptacle, thereby forming the optical connection therebetween. The first and second ferrules 24, 26 project or extend from the first end 16 of the outer housing 12 when the ferrule assembly 14 is disposed in the interior of the outer housing. The ferrule assembly 14 is releasably coupled to (e.g., received in) the outer housing 12. In the illustrated embodiment, the outer housing 12 and the ferrule assembly 14 are free of mechanical connection to one another. Ferrule assembly 14 is able to slide into and out of the interior of the outer housing 12 through the rear end 18, when the rear end is not closed off as described below. The ferrule assembly 14 is configured to mating reception in the outer housing 12 in a first position (FIGS. 1 and 2) corresponding to a first polarity of the fiber optic connector 10 and in a second position (not shown) corresponding to a second polarity of the fiber optic connector. In the first position corresponding to the first polarity of the fiber optic connector 10, the first ferrule 24 is disposed above the second ferrule 26 (e.g., the first ferrule is adjacent a first side of the outer housing 12 and the second ferrule is adjacent a second side of the outer housing). In the second position corresponding to the second polarity of the fiber optic connector 10, the second ferrule 26 is disposed above the first ferrule 24 (e.g., the second ferrule is adjacent the first side of the outer housing 12 and the first ferrule is adjacent the second side of the outer housing). In other words, changing the polarity of the fiber optic connector 10 changes the orientation of the first and second ferrules 24, 26 relative to the outer housing 12, and thereby the fiber optic receptacle (due to the polarity keys 20 permitting the coupling in only one orientation). The fiber optic connector 10 permits the polarity of the ferrule assembly 14 to be changed relative to the outer housing 12. Specifically, the ferrule assembly 14 can be removed from the outer housing 12, turned over (e.g., rotated about 180 degrees about the connection axis CA) and inserted back into the outer housing to change the polarity of the ferrule assembly. The first and second ferrules 24, 26 project from the front end 16 of the outer housing 12 in both the first and second positions.

As an example, the first ferrule 24 may receive optical signals and the second ferrule 26 may send optical signals. Therefore, when the fiber optic connector 10 is coupled to the fiber optic receptacle, the first ferrule 24 needs to be positioned to receive optical signals from the fiber optic receptacle and the second ferrule 26 needs to be positioned to send optical signals to the fiber optic receptacle. Being able to place the ferrule assembly 14 in either the first or second position ensures the first and second ferrules 24, 26 can be appropriately positioned relative to the fiber optic receptacle to form the optical connection (e.g., match the polarity of the fiber optic receptacle). If the polarity ferrule assembly 14 relative to the outer housing 12 does not match the polarity of the fiber optic receptacle, the optical connection will not form when the fiber optic connector 10 is coupled to the fiber optic receptacle.

The fiber optic connector 10 includes a boot assembly 30. Generally, the boot assembly 30 secures the ferrule assembly 14 in the interior of the outer housing 12. To secure the ferrule assembly 14 to the outer housing 12, the boot assembly 30 generally closes off the rear end 18 of the outer housing when the boot assembly is attached to the outer housing. Thus, the boot assembly 30 inhibits the removal of the ferrule assembly 14 from the outer housing 12 when the boot assembly is connected to the outer housing. The boot assembly 30 is releasably connected to the outer housing 12 to enable the ferrule assembly to be inserted into the outer housing (through the rear end 18) along the connection axis CA and to be removed from the outer housing (through the rear end) along the connection axis when the boot assembly is disconnected from the outer housing. By removing or disconnecting the boot assembly 30 from the outer housing 12, the ferrule assembly 14 can be removed from the outer housing (through the rear end 18), turned over and then re-inserted back into the outer housing (through the rear end) to change the polarity of the fiber optic connector 10. The boot assembly 30 can then be re-connected to the outer housing 12 (by inserting the boot assembly into the rear end 18) to re-secure the ferrule assembly 14 in the interior of the outer housing. In this embodiment, the boot assembly 30 includes a locking device 28 (e.g., a back post) and a strain relief boot 32.

The locking device 28 is releasably connected to the outer housing 12 and securely attached to the strain relief boot 32. Specifically, the locking device 28 is releasably coupled to the outer housing 12. The locking device 28 is inserted into the rear end 18 of the outer housing 12 to attach the locking device to the outer housing. When the locking device 28 is attached to the outer housing 12, the locking device secures the ferrule assembly 14 in the interior of the outer housing. The locking device 28 generally closes off the rear end 18 of the outer housing 12, thereby securing the ferrule assembly 14 in the outer housing.

Figure 4:
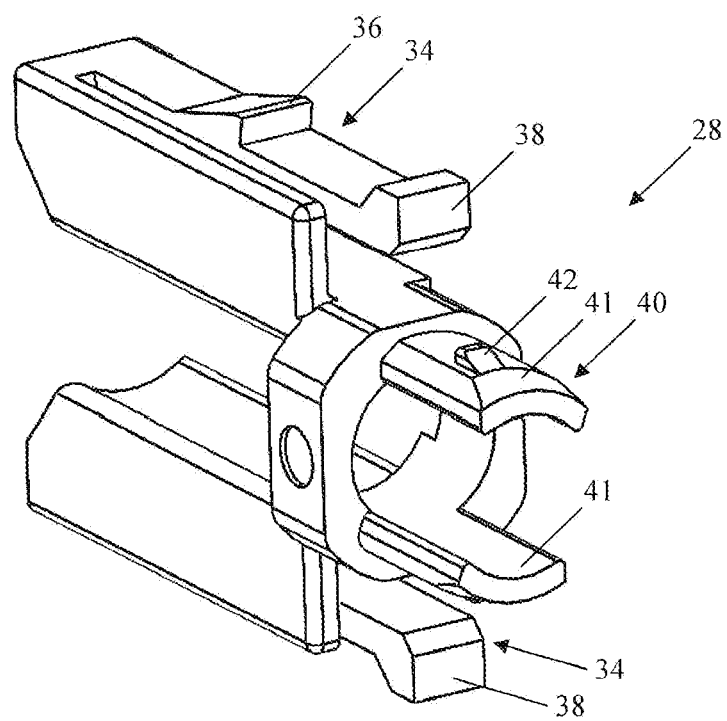
FIG. 4 is a perspective of a locking device of the fiber optic connector.
Figure 5:
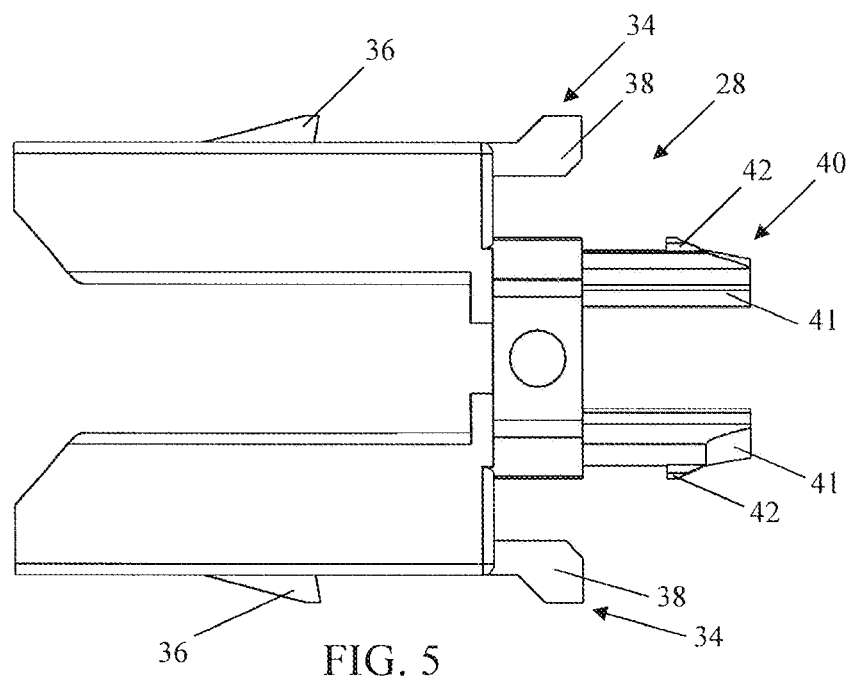
FIG. 5 is side view of the locking device.
Figure 6:
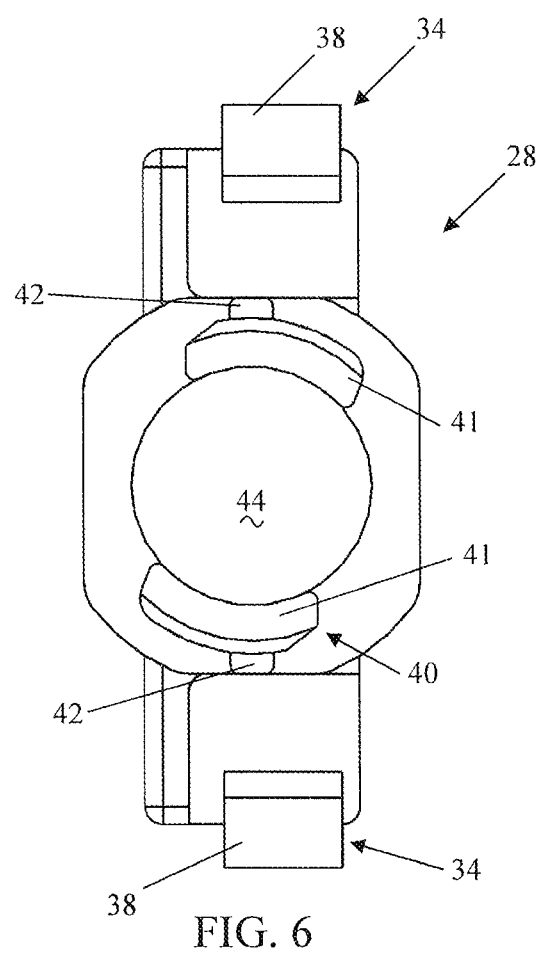
FIG. 6 is a rear view of the locking device.

Referring to FIGS. 4-6, the locking device 28 includes a deflectable latch 34 (broadly, the deflectable latch is associated with the boot assembly). The deflectable latch 34 is engageable with the outer housing 12 to prevent disconnection of the boot assembly 30 with the outer housing, and is deflectable out of engagement with the outer housing to permit disconnection of the boot assembly with the outer housing. In the illustrated embodiment, the deflectable latch 34 is engageable with the outer housing adjacent the rear end 18 of the outer housing. The latch 34 includes a tab or catch 36 positioned for engaging the outer housing 12. Specifically, the tab 36 engages the edge of a recess or opening in the outer housing 12, to secure the locking device 28 (broadly, the boot assembly 30) to the outer housing. (see FIG. 2). The latch 34 also includes a finger tab 38 positioned to be engaged by a user for deflecting the deflectable latch and moving the tab 36 out of position to engage the outer housing 12. When the tab 36 is out of position to engage the outer housing 12, the locking device 28 and entire boot assembly 30 can be disconnected or removed from the outer housing 12. Accordingly, the latch 34 is moveable from a latched position (FIG. 2) where the tab 36 is engaged with the outer housing 12 to secure the locking device 28 (broadly, boot assembly 30) to the outer housing and an unlatched position (not shown) where the latch is detached from the outer housing to permit the locking device to be separated from the outer housing. The latch 34 is resiliently deflectable, thereby allowing the latch to return to the latched position from the unlatched position. In the illustrated embodiment, the locking device 28 includes two latches 34 (broadly, at least one latch). The two latches 34 are generally identical and located on opposite (top and bottom) sides of the locking device 28.

To disconnect the boot assembly 30 from the outer housing 12, a user depresses the latch 34 to move the tab 36 inward and out of the opening in the outer housing (e.g., the unlatched position). After the latch 34 is depressed, the boot assembly 30 is moved rearward, away from the outer housing 12. To connect the boot assembly 30 to the outer housing 12, the locking device 28 is inserted into the rear end 18 of the outer housing. As the locking device 28 moves forward, toward the front end 16, the outer housing 12 engages a ramp surface of the tab 36 and depresses the latch 34. The latch 34 returns to its original or at rest position (e.g., latched position) once the tab 36 becomes aligned with the opening in the outer housing 12, thereby securing the locking device 28 and hence, the boot assembly 30 to the outer housing.

In this embodiment, the locking device 28 includes a stator 40 for mounting the strain relief boot 32 on the locking device. In the illustrate embodiment, the stator 40 includes two arcuate, partially circumferential flanges 41. The stator 40 includes at least one stator tab or catch 42 for securing the strain relief boot 32 to the stator. In the illustrated embodiment, the stator 40 includes two catches 42, one on each flange 41. The locking device 28 includes a cable opening 44 sized and shaped to permit the cable C to pass therethrough. In the illustrated embodiment, the cable opening 44 is generally aligned with the rotational axis (e.g., central axis CA) of the stator 40.

Figure 7:
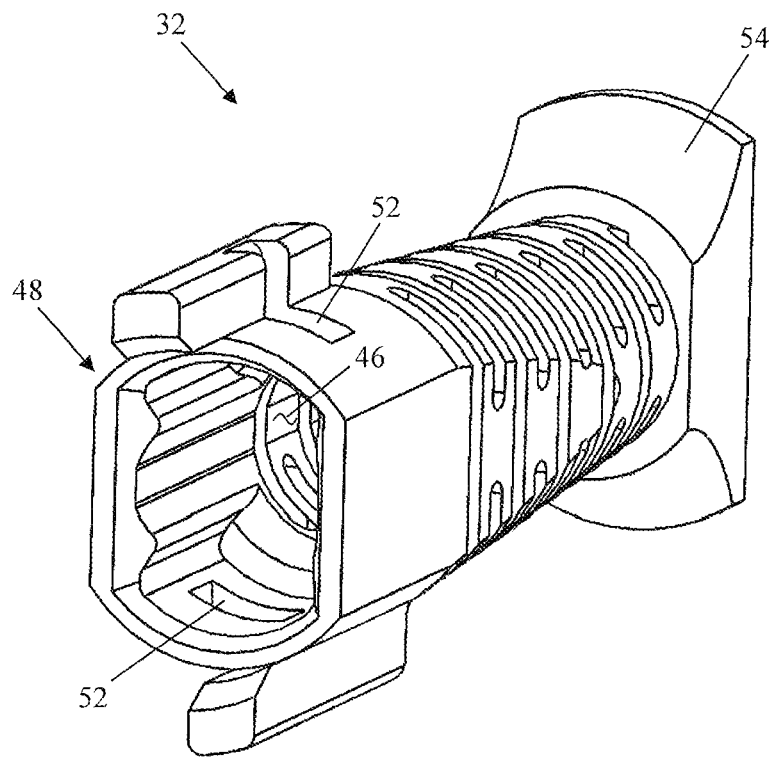
FIG. 7 is a perspective of a strain relief boot of the fiber optic connector.
Figure 8:
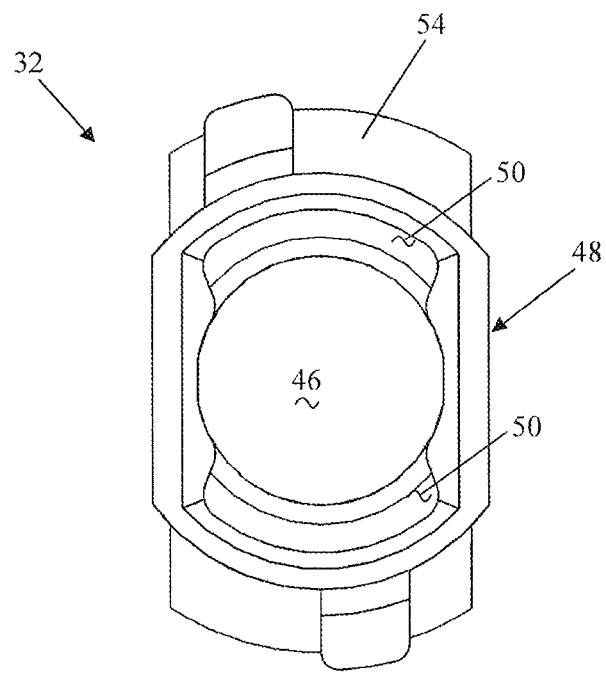
FIG. 8 is a front view of the boot.
Figure 9:
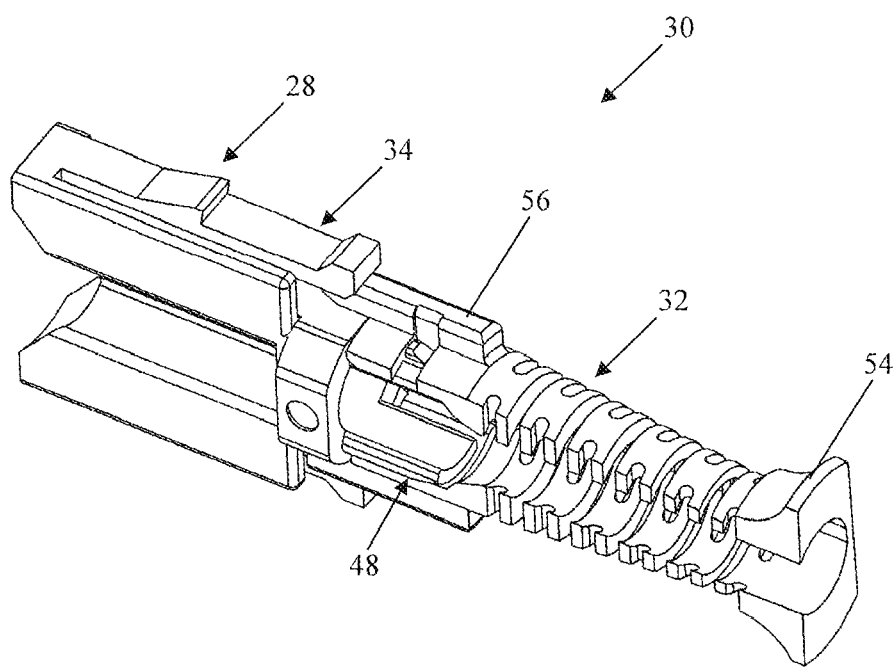
FIG. 9 is a perspective of a boot assembly including the boot and the locking device, with a portion of the boot assembly cut away to reveal interior details, the boot assembly in a locked position.
Figure 10:
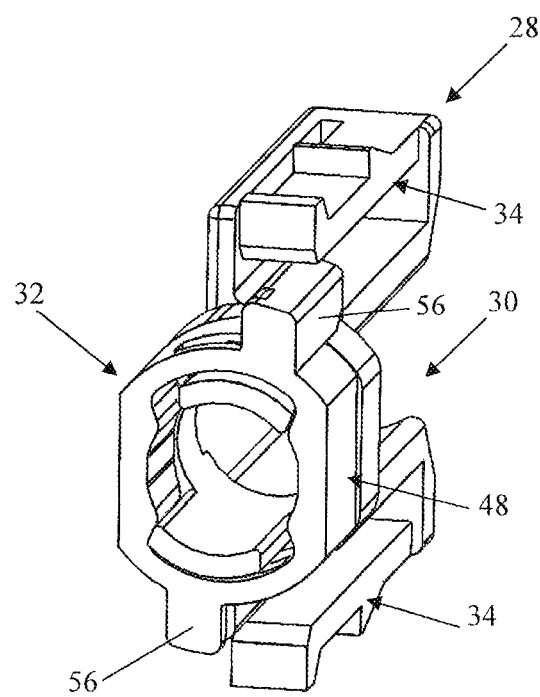
FIG. 10 is cross sectional rear perspective of the boot assembly mounted on the locking device, the boot assembly in the locked position.
Figure 11:
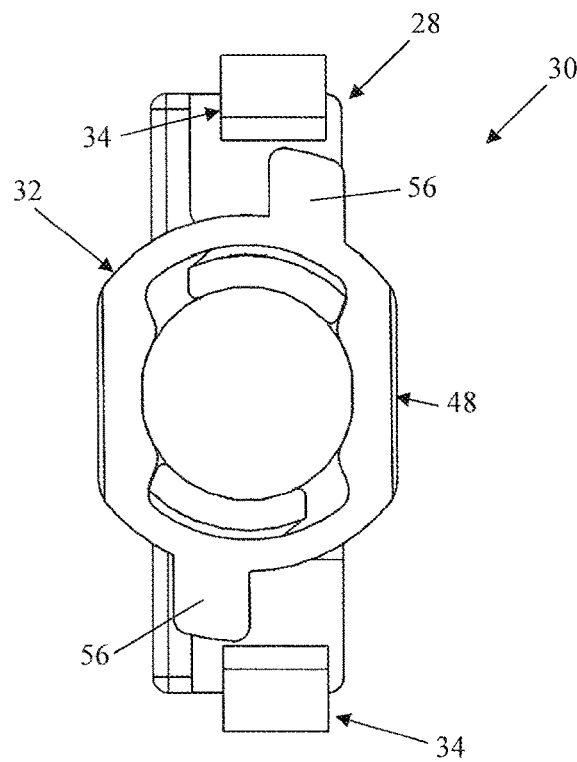
FIG. 11 is a cross section of the boot assembly mounted on the locking device, with the boot assembly in the locked position.

Referring to FIGS. 7-9, the strain relief boot 32 is configured to brace a portion of the cable C to reduce the forces exerted on the ferrule assembly 14 by the cable. The strain relief boot 32 is constructed to receive the cable C therethrough. The strain relief boot 32 defines a cable lumen or passageway 46 sized and shaped to permit the cable C to pass therethrough. Preferably, the strain relief boot 32 is flexible (e.g., resiliently bendable or deformable) to permit the cable C to bend and move out of alignment with the central axis CA as the cable extends from the outer housing 12. In this embodiment, the strain relief boot 32 is coupled to the locking device 28. The strain relief boot 32 includes a rotor 48, but the entire boot may be considered a rotor. The rotor 48 is adjacent the forward end of the strain relief boot 32. The rotor 48 of the strain relief boot 32 is operatively connected to the outer housing 12 for rotation with respect to the outer housing and locking device 28 about the connection axis CA. Specifically, the rotor 48 is rotatably mounted to the stator 40 of the locking device 28. The rotor 48 includes stator recesses 50 that receive the flanges 41 of the stator 40. The recesses 50 are arcuate and oversized, compared to the flanges 41, to permit the rotor 48 rotate about the stator 40 (e.g., about central axis CA). The rotor 48 includes apertures or slots 52, each sized and shaped to receive the one of the catches 42 of the stator 40. The catches 42 engage an edge of the rotor 48 defining each slot 52 to secure the strain relief boot 32 to the locking device 28. The catches 52 move in the slots 52 as the rotor 48 is rotated about the stator 40, but the locking device 28 and strain relief boot 32 remain securely connected to each other. The strain relief boot 32 may also include a pull tab 54 for a user to grab in order to move the strain relief boot (e.g., remove the boot assembly 30 from the outer housing 12). In the illustrated embodiment, the pull tab 54 is disposed adjacent to (e.g., at) a rear end of the strain relief boot 32.

Figure 12:
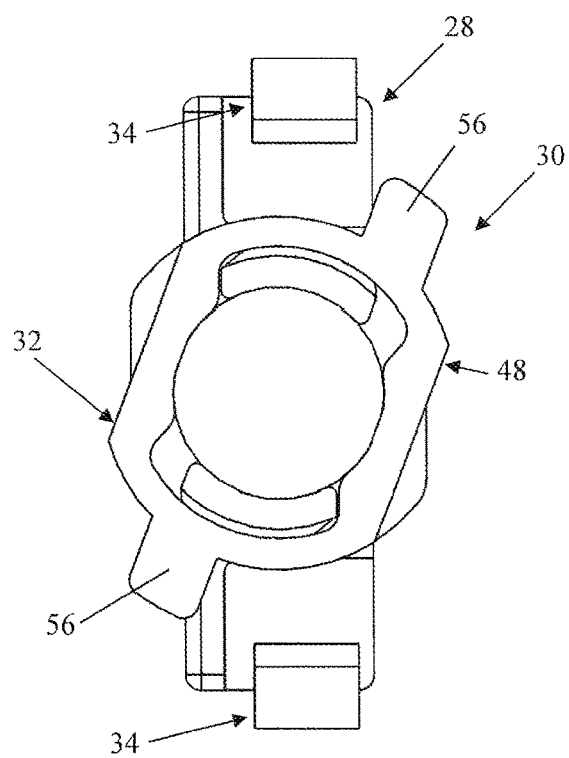
FIG. 12 is a cross section of the boot assembly mounted on the locking device, with the boot assembly in the release position.
Figure 13:
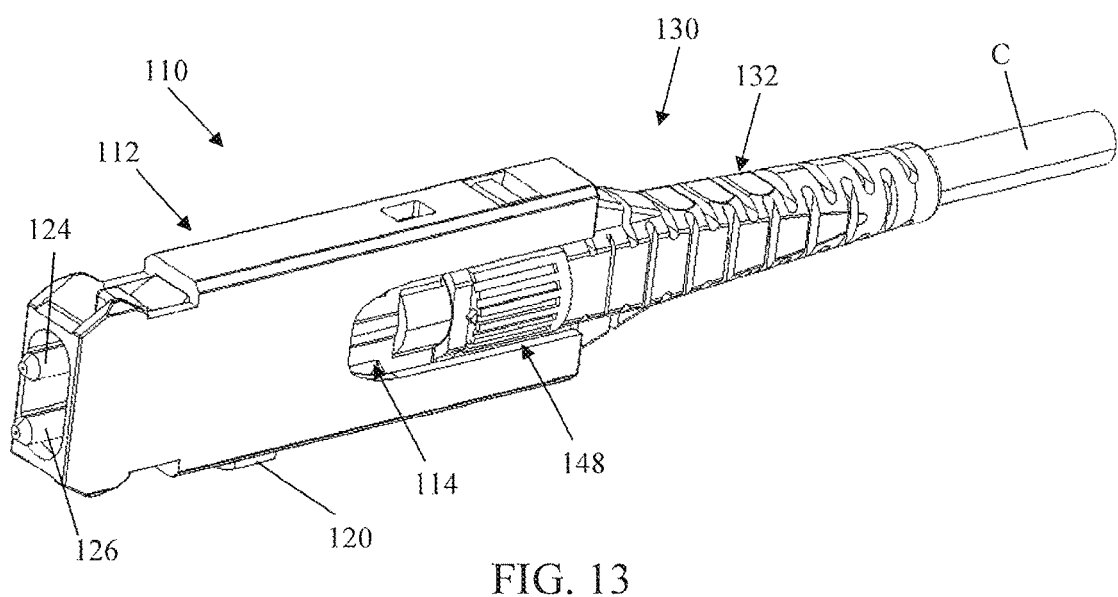
FIG. 13 is a perspective of a fiber optic connector according to another embodiment of the present disclosure.

Referring to FIGS. 9-12, the strain relief boot 32 (e.g., rotor 48) includes a blocking portion 56. The blocking portion 56 is configured to block disconnection of the boot assembly 30 (e.g., locking device 28) from the outer housing 12. In the illustrated embodiment, the blocking portion 56 comprises a protrusion. The protrusion extends generally radially outward. The strain relief boot 32 is movable between a locked position (FIG. 11) and a release position (FIG. 12). The blocking portion 56 is configured to block disconnection of the boot assembly 30 (e.g., locking device 28) with the outer housing in the locked position. Specifically, in the locked position, the blocking portion 56 is disposed or arranged to inhibit the latch 34 from being moved to the unlatched position—preventing the locking device 28 from uncoupling with the outer housing 12. In the locked position (FIGS. 9-11), the blocking portion 56 of the strain relief boot 32 (e.g., rotor 48) is arranged with respect to the deflectable latch 34 so that the blocking portion is disposed for engagement with the deflectable latch to prevent the deflectable latch from being deflected. In the locked position, the blocking portion 56 is aligned with or underlies the latch 34 to prevent the latch from moving inward or toward the unlatched position (e.g., from being depressed). The blocking portion 56 is positioned such that the latch 34 engages and is stopped by the blocking portion when the latch is depressed before the latch reaches the unlatched position. The blocking portion 56 is configured to permit disconnection of the boot assembly 30 (e.g., locking device 28) with the outer housing 12 in the release position (FIG. 12). Specifically, in the release position, the blocking portion is disposed or arranged to permit the latch 34 to move to the unlatched position—enabling the locking device 28 and entire boot assembly 30 to uncouple from the outer housing 12. In the release position, the blocking portion 56 of the strain relief boot 32 is arranged with respect to the deflectable latch 34 so that the blocking portion is out of the way of the deflectable latch to permit deflection of the deflectable latch. In the release position, the blocking portion 56 is not aligned (e.g., radially aligned) with the latch 34, thereby enabling the latch to be deflected inward to the unlatched position (e.g., the latch can be depressed). The blocking portion 56 is positioned such that the latch 34 does not engage and is not stopped by the blocking portion when the latch is depressed. In the illustrated embodiment, the strain relief boot 32 includes two blocking portions 56, one for each latch 34 of the locking device 28.

In the illustrated embodiment, the strain relief boot 32 (e.g., rotor 48) is rotatable between the locked position (FIG. 11) and the release position (FIG. 12). Preferably, the strain relief boot 32 is configured to rotate about 90 degrees or less between the locked position and the release position. Such a short rotation allows faster disconnection and connection of the boot assembly 30 to the outer housing 12. Even more preferably, the rotation is limited to about 45 degrees or less, or even more preferably, about 15 degrees between the locked position and the release position. In the illustrated embodiment, the stator 40 is configured to limit the rotation of the strain relief boot 32 (e.g., rotor 48) relative to the locking device 28 (broadly, outer housing 12). The stator 40 (e.g., flanges 41) may engage the sides of the strain relief boot 32 defining the stator recesses 50 to position the strain relief boot in the locked and release positions (e.g., limit over rotation of the rotor 48). The friction between the rotor 48 and stator 40 may keep the rotor from freely rotating about the stator (e.g., central axis CA).

In operation, the strain relief boot 32 (e.g., rotor 48) inhibits the intentional withdrawal or disconnection of the boot assembly 30 (e.g., locking device 28) when in the locked position. To change the polarity of the fiber optic connector 10, the strain relief boot 32 is moved (e.g., rotated) to the release position. After, the latches 34 are depressed and the boot assembly 30 is moved rearward relative to the outer housing 12. As the boot assembly 30 is moved rearward, the locking device 28 withdraws from the rear end 18 of the outer housing 12. After the boot assembly 30 is removed, the ferrule assembly 14 can then be removed as well. The ferrule assembly 14 is moved rearward relative to the outer housing 12, and out of the outer housing. The ferrule assembly 12 is then turned over (180° relative to the outer housing 12) and inserted back into the outer housing. By turning over the ferrule assembly 14, the polarity of the fiber optic connector 10 is changed. The ferrule assembly 12 is moved forward, into the interior of the outer housing 12 through the rear end 18. After the ferrule assembly 12 is positioned in the interior of the outer housing 12, the boot assembly 30 is re-connected to the outer housing. The boot assembly 30 (e.g., locking device 28) is moved forward and inserted into the rear end 18 of the outer housing 12. As the boot assembly 30 is moved forward, the latches 34 (e.g., tabs 36) are engaged and deflected by the outer housing 12. The latches 34 return or snap-back to the latched position when the tabs 36 become aligned with the openings in the outer housing 12, thereby securing the boot assembly 12 and the ferrule assembly 14 to the outer housing 12. The strain relief boot 32 is then rotated back to the locked position. As mentioned above, any unintentional withdrawal or movement of the latches 34 is prevented by the blocking portions 56 when the rotor 48 is in the locked position, thereby locking the boot assembly 30 to the outer housing 12.

In one embodiment, the boot assembly 30 is operatively connected to the ferrule assembly 14. For example, the cable lumen 44 of the strain relief boot 32 is sized and shaped to receive the cable C. The boot assembly 30 is then operatively coupled to the ferrule assembly 14 through the strain relief boot 32 and cable C and secured in a suitable manner to a back post of the ferrule assembly 14. In this embodiment, the connection between the ferrule assembly 14 and boot assembly 30 results in conjoint movement of these components. For example, the ferrule assembly 14 and boot assembly 30 would move conjointly along the connection axis CA to insert the ferrule assembly into the outer housing 12 and to remove the ferrule assembly from the outer housing along the connection axis. Likewise, the boot assembly 30 would also be turned over (e.g., rotated 180 degrees about the connection axis CA) when the ferrule assembly 14 is turned over to change the polarity. The boot assembly 30 is generally symmetrical and can be attached to the outer housing if turned over. In other words, the boot assembly 30 (e.g., locking device 28) and the ferrule assembly 14 can both be coupled to the outer housing 12 in a first orientation and a second orientation, the second orientation being a rotation of about 180 degrees about the central axis CA relative to the first orientation. The connection or coupling of the boot assembly 30 and the ferrule assembly 14 is generally the same in both the first and second orientations.

Referring to FIGS. 13-18D, another embodiment of the fiber optic connector according to the present disclosure is generally indicated by reference numeral 110. Fiber optic connector 110 is generally analogous to fiber optic connector 10 and, thus, for ease of comprehension, where similar, analogous or identical parts are used, reference numerals "100" units higher are employed. Accordingly, unless clearly stated or indicated otherwise, the above descriptions regarding fiber optic connector 10 also apply to fiber optic connector 110. The fiber optic connector 110 includes an outer housing 112 having polarity keys 120.

The fiber optic connector 110 of this embodiment is a reversible polarity fiber optic connector, like fiber optic connector 10. In this embodiment, the fiber optic connector 110 has a removable (e.g., releasable) boot assembly 130 having a different configuration than the boot assembly 30 described above. The boot assembly 130 includes a strain relief boot 132 and a rotor 148. The strain relief boot 132 is connected to the outer housing 112. Specifically, the strain relief boot 132 is releasably coupled to the outer housing 112. The strain relief boot 132 is inserted into the rear end 118 of the outer housing 112 to attach the strain relief boot (broadly, boot assembly 130) to the outer housing. When the strain relief boot 132 is attached to the outer housing 112, the strain relief boot secures the ferrule assembly 114 in the interior of the outer housing. The strain relief boot 132 generally closes off the rear end 118 of the outer housing 112, thereby securing the ferrule assembly 114 in the outer housing.

Figure 14:
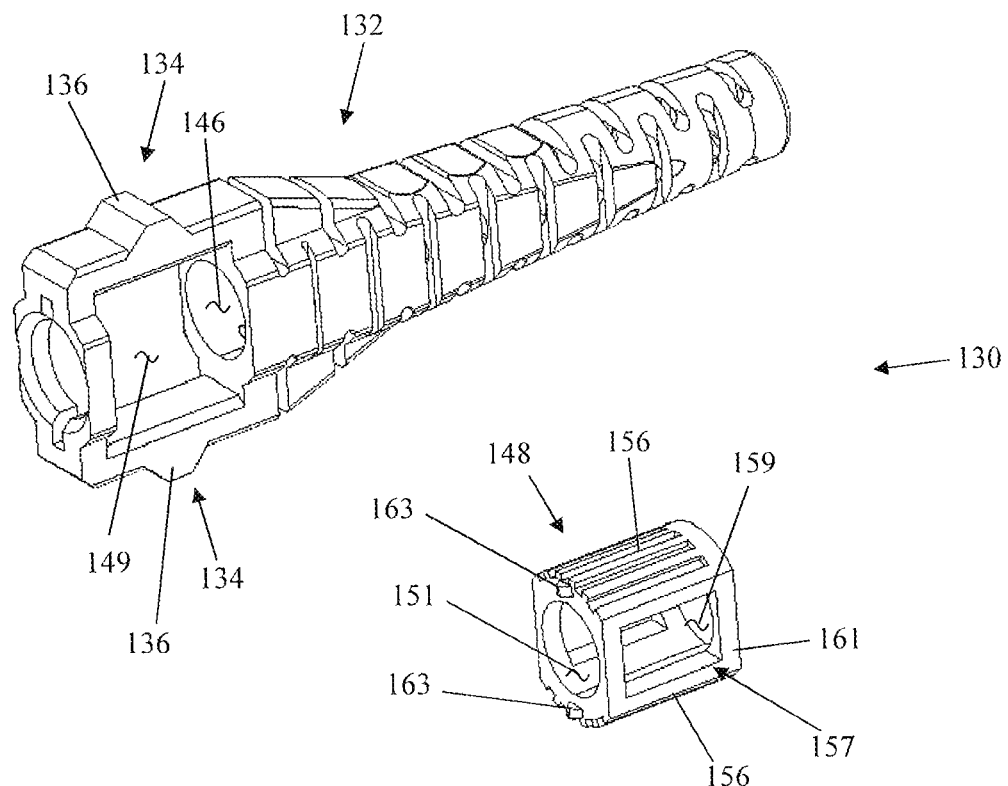
FIG. 14 is an exploded perspective of a boot assembly of the fiber optic connector of FIG. 13.
Figure 15:
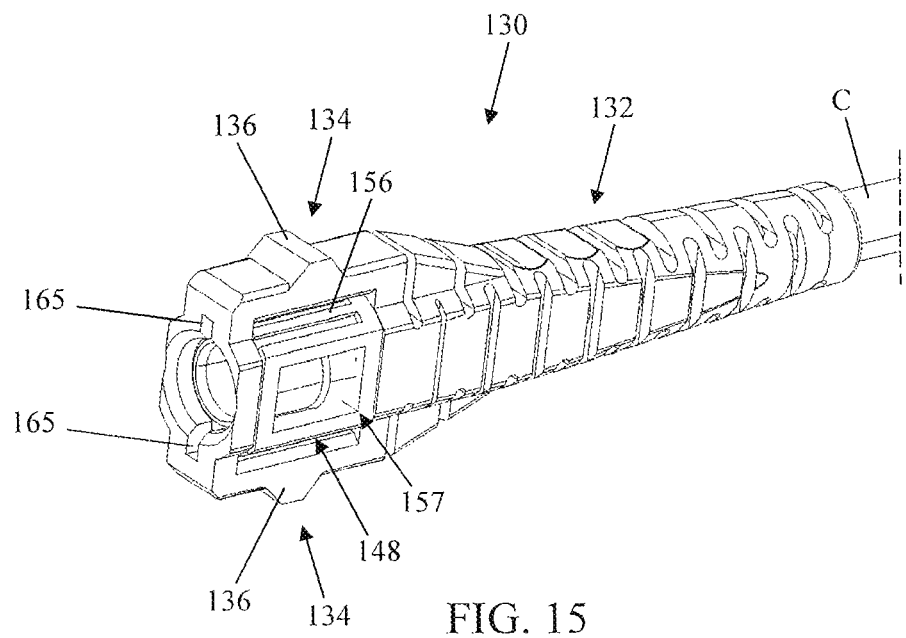
FIG. 15 is a perspective of the boot assembly of the fiber optic connector of FIG. 13, with a rotor of the boot assembly in a locked position.

Referring to FIGS. 14-16, the strain relief boot 132 includes a deflectable latch 134 (broadly, the deflectable latch is associated with the boot assembly 130). The deflectable latch 134 is engageable with the outer housing 112 to prevent disconnection of the boot assembly 130 (e.g., strain relief boot 132) with the outer housing, and is deflectable out of engagement with the outer housing to permit disconnection of the boot assembly with the outer housing. The latch 134 includes a tab or catch 136 positioned for engaging the outer housing 112. The catch 136 includes opposite front and rear ramped surfaces to facilitate insertion and removal of the strain relief boot 132 into and from the outer housing 112 (e.g., to facilitate deflection of the latch 134). The latch 134 is moveable from a latched position (FIG. 17A) where the latch is engaged with the outer housing 112 to secure the boot assembly 130 to the outer housing and an unlatched position (FIG. 17C) where the latch is detached from the outer housing to permit the strain relief boot to be separated from the outer housing. The latch 134 is resiliently deflectable, thereby allowing the latch to return to the latched position from the unlatched position. In the illustrated embodiment, the strain relief boot 132 includes two latches 134 (broadly, at least one latch). The two latches 134 are generally identical in structure and operation.

In this embodiment, the rotor 148 is separate from and able to move (e.g., rotate) relative to the strain relief boot 132. Referring to FIG. 14, the strain relief boot 132 defines a rotor receiving space or cavity 149 sized and shaped to receive the rotor 148. The cavity 149 is adjacent the latch 134. Accordingly, when the latch 134 deflects, the latch deflects or moves into the cavity 149. The is disposed in the cavity 149. The cavity 149 is in communication with the cable lumen. The cable C extends through the cavity 149. The rotor 148 defines a cable lumen or passageway 151 through which the cable C extends. The cable lumen 151 is generally aligned with a rotation axis (e.g., central axis CA) of the rotor 148. The rotor is rotatable about the cable C (e.g., central axis CA). Thus, the cable C acts as a stator for the rotor 148 in this embodiment. The cavity 149 has opposite open sides to permit the user to engage the rotor 148 to move (e.g., rotate) the rotor.

The rotor 148 includes a blocking portion 156. In this embodiment, the blocking portion 156 comprises an arcuate portion or surface. The rotor 148 includes an unblocking or space-creating portion 157. The unblocking portion 157 is configured to permit the latch 134 to deflect or move to the unlatched position (e.g., move into the cavity 149 a sufficient amount such that the catch 136 is out of the opening in the outer housing 112). In this embodiment, the unblocking portion 157 comprises an opening 159 into which the latch 134 can move (e.g., be deflected) into. In the illustrated embodiment, the opening 159 is defined by and extends inward from a generally flat portion or surface 161 of the unblocking portion 157. The flat portion 161 (e.g., center thereof) is generally disposed more radially inward than the arcuate portion (e.g., center thereof) of the blocking portion 156 to create space for the latch 134 to deflect. The rotor 148 is movable between a locked position (FIGS. 15 and 17A) and a release position (FIG. 16 and FIGS. 17B-C). The blocking portion 156 is configured to block disconnection of the boot assembly 130 (e.g., strain relief boot 132) with the outer housing 112 in the locked position. Specifically, in the locked position, the blocking portion 156 is disposed or arranged to inhibit the latch 134 from being moved to the unlatched position—preventing the strain relief boot 132 from uncoupling with the outer housing 112. In the locked position (FIGS. 15 and 17A), the blocking portion 156 of the rotor 148 is arranged with respect to the deflectable latch 134 so that the blocking portion is disposed for engagement with the deflectable latch to prevent the deflectable latch from being deflected. In the locked position, the blocking portion 156 is aligned with or underlies (e.g., radially underlies) the latch 134 to prevent the latch from moving inward or toward the unlatched position. The blocking portion 156 is positioned such that the latch 134 engages and is stopped by the blocking portion when the latch is depressed before the latch reaches the unlatched position. In particular, the arcuate portion of the blocking portion 156 is in registration with the deflectable latch 134 in the locked position.

The blocking portion 156 is configured to permit disconnection of the boot assembly 130 with the outer housing 112 in the release position (FIG. 16 and FIGS. 17B-C). Specifically, in the release position, the blocking portion is disposed or arranged to permit the latch 134 to move to the unlatched position—enabling the strain relief boot 132 to uncouple from the outer housing 112. In the release position, the blocking portion 156 of the rotor 148 is arranged with respect to the deflectable latch 134 so that the blocking portion is out of the way of the deflectable latch to permit deflection of the deflectable latch. In the release position, the blocking portion 156 is not in registration or aligned with the latch 134, thereby enabling the latch to be deflected inward to the unlatched position (e.g., the latch can be depressed). The blocking portion 156 is positioned such that the latch 134 does not engage and is not stopped by the blocking portion when the latch is depressed. Said another way, the unblocking portion 157 is configured to permit disconnection of the boot assembly 130 (e.g., strain relief boot 132) with the outer housing 112 in the release position. Specifically, in the release position, the unblocking portion 157 is disposed or arranged to permit the latch 134 to move to the unlatched position—enabling the boot assembly 130 to uncouple from the outer housing 112. In the release position, the unblocking portion 157 of the rotor 148 is arranged with respect to the deflectable latch 134 so that the unblocking portion is in registration with the deflectable latch to permit deflection of the deflectable latch into the cavity 149. In the release position, the unblocking portion 157 is in registration or aligned with the latch 134, thereby enabling the latch to be deflected inward to the unlatched position. The unblocking portion 157 is positioned such that the latch 134 can move into the opening 159 when the latch is depressed.

In the illustrated embodiment, the rotor 148 includes two blocking portions 156, one for each latch 134 of the strain relief boot 132. Likewise, the rotor 148 includes two unblocking portions 157, one for each latch 134 of the strain relief boot 132. The two latches 134 of the strain relief boot 132 are disposed on generally opposite sides of the strain relief boot. In the illustrated embodiment, the two latches 134 define opposite sides (e.g., closed sides) of the cavity 149. Accordingly, the two blocking portion 156 are disposed on opposite sides of the rotor 148 and the two unblocking portions 157 are disposed on opposite sides of the rotor. Therefore, the rotor 148 has a non-circular cross section. The arcuate portions of the blocking portions 156 are disposed between and interconnect the flat portions 161 of the unblocking portions 157. The blocking portions 156 have ribs to improve the ability to grip the rotor 148 for turning. The rotor 148 may include at least one detent 163. In the illustrated embodiment, the rotor 148 includes two detents 163 on opposite sides of the rotor, each detent being adjacent to one of the blocking portions 156. The detents 163 extend into recesses or slots 165 in the strain relief boot 132 to secure and hold the rotor 148 in the locked position. The detents 163 overlie flats on opposite sides of the strain relief boot 132 to secure and hold the rotor in the release position (FIG. 16). The detents 163 and/or strain relief boot 132 are resiliently deformable to permit the detents to move relative to the strain relief boot 132 when the rotor 148 is rotated with the application of a sufficient amount of manual force by a user. Accordingly, the detents 163 prevent the rotor 148 from unintentionally moving from the locked position and the release position.

Referring to FIGS. 17A-C, to disconnect the strain relief boot 132 (broadly, the boot assembly 130) from the outer housing 112, a user moves the rotor 148 to the release position. The user may then pull the strain relief boot 132 in a rearward direction relative to the outer housing 112. As the strain relief boot 132 is moved rearward, the catch 136 of each latch 134 engages the outer housing 112, which with the aid of the sloped side surface of the latch deflects the latch inward to the unlatched position (FIG. 17C). With the latch 134 in the unlatched position, the user can continue to move the boot assembly 130 rearward, away from the outer housing 112. The ferrule assembly 114 is also removed from the outer housing 112 to change the polarity of the fiber optic connector 110. To connect the boot assembly 130 (e.g., strain relief boot 132) to the outer housing 112, the strain relief boot is inserted into the rear end 118 of the outer housing. As the strain relief boot 132 moves forward, toward the front end 116, the outer housing 112 engages the catch 136 and depresses the latch 134. Deflection of the latch 134 is facilitated by a sloped front surface of the latch. The latch 134 returns to its original or at rest position (e.g., latched position) once the catch 136 becomes aligned with the opening in the outer housing 112, thereby securing the boot assembly 130 to the outer housing. The user then rotates the rotor 148 to the locked position, to lock the boot assembly 130 to the outer housing 112. Preferably, the rotor 148 rotates about 90 degrees between the locked position and the release position.

Figure 18A:
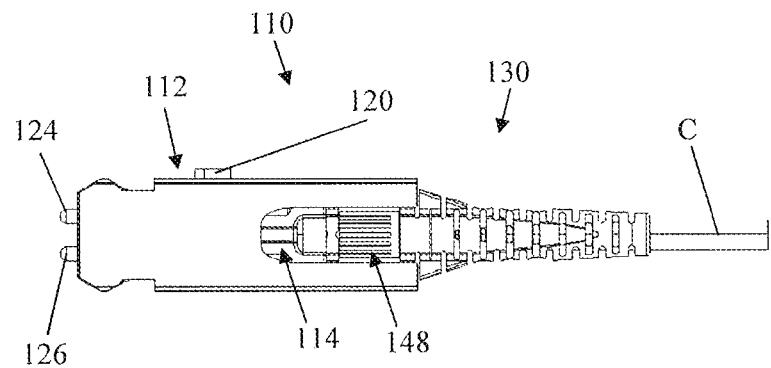
FIGS. 18A-D illustrate the steps of changing the polarity of the fiber optic connector of FIG. 13.
Figure 18B:
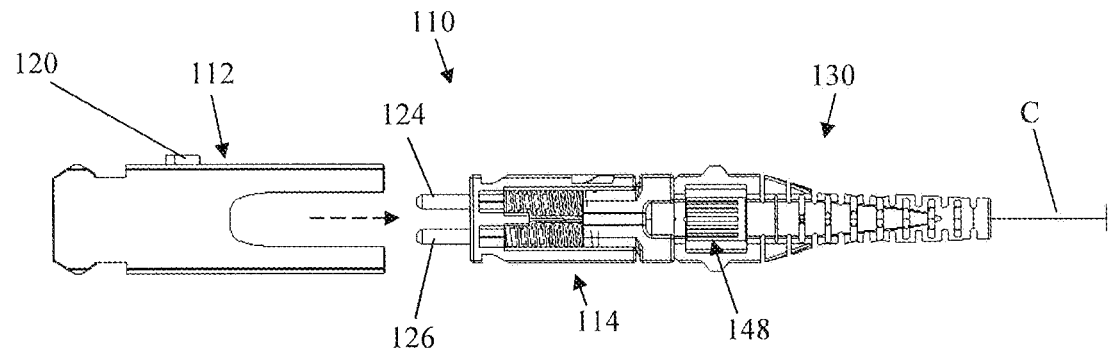
Figure 18C:
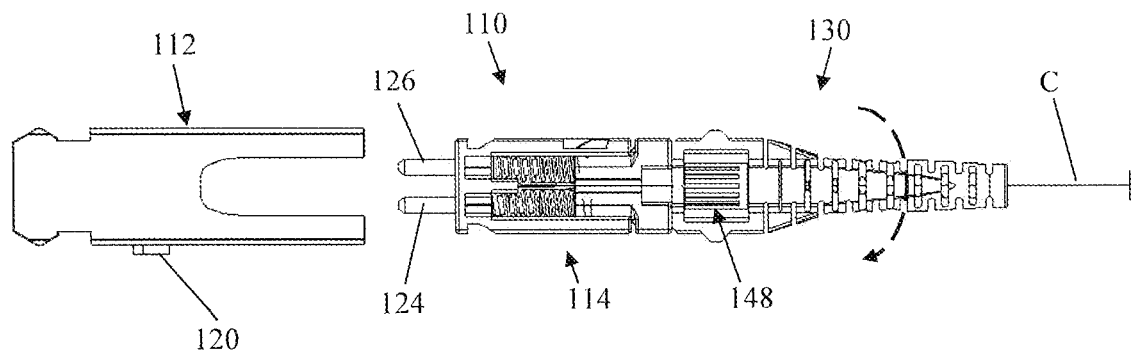
Figure 18D:
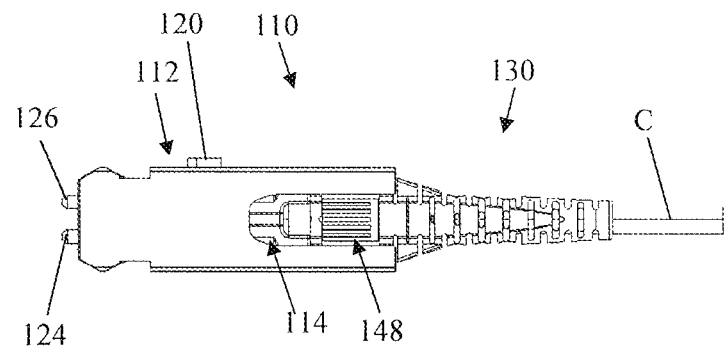
Figure 19:
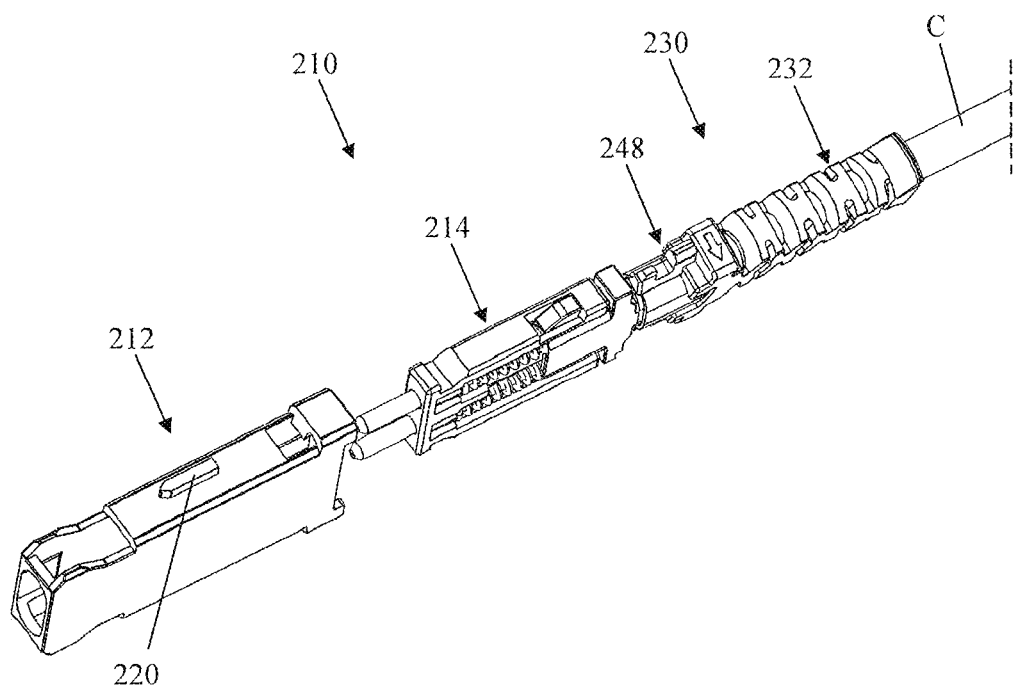
FIG. 19 is an exploded perspective of a fiber optic connector according to another embodiment of the present disclosure.
Figure 20:
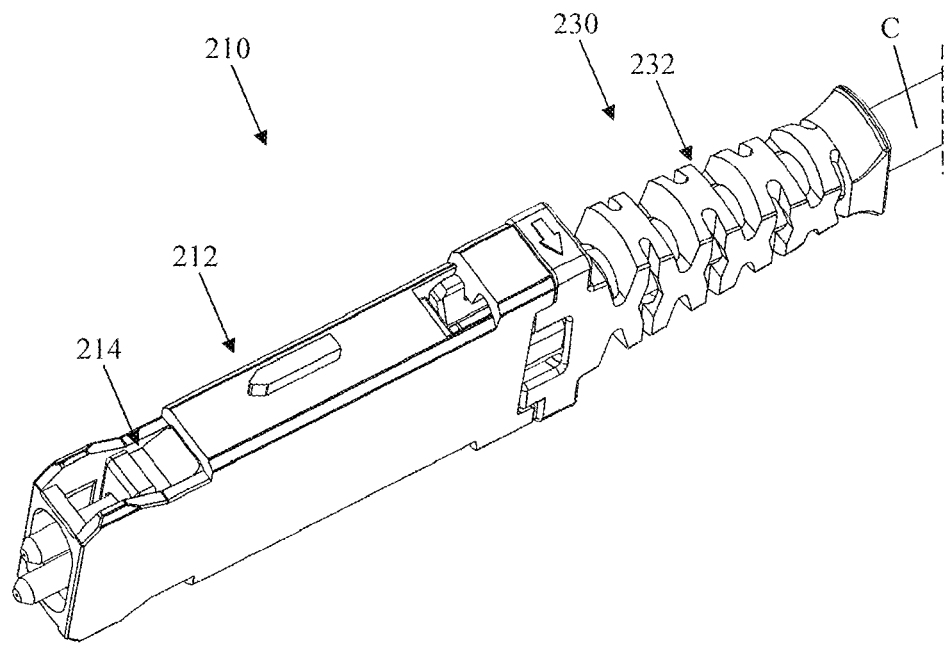
FIG. 20 is a perspective of the fiber optic connector of FIG. 19, with a boot assembly in a locked position.
Figure 21:
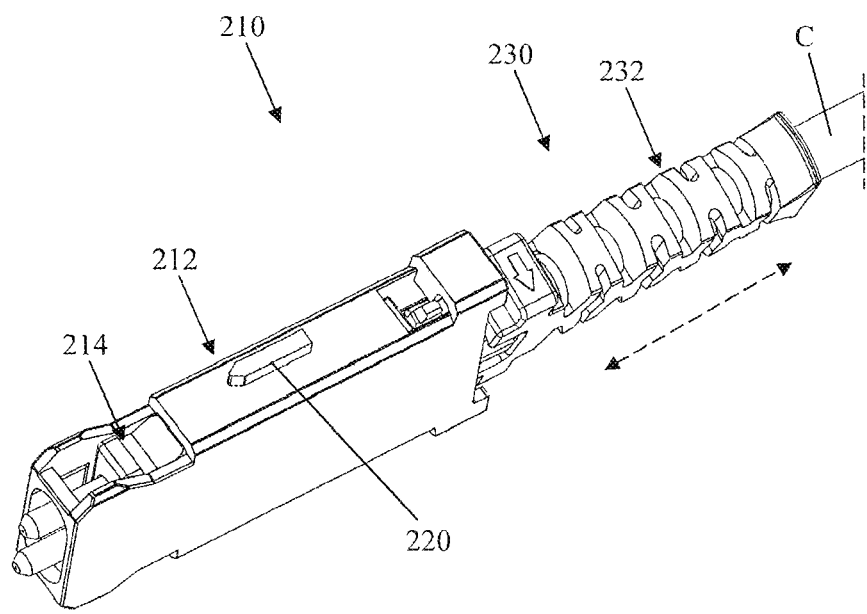
FIG. 21 is a perspective of the fiber optic connector of FIG. 19, with the boot assembly in a release position.

Referring to FIGS. 18A-18D, the steps for changing the polarity of the fiber optic connector 110 are generally shown. In FIG. 18A, the fiber optic connector 110 is configured in a first configuration corresponding to a first polarity (e.g., the ferrule assembly 114 is in the first position). In this configuration, the first ferrule 124 is disposed above the second ferrule 126. To change the polarity of the fiber optic connector 110 to the second configuration corresponding to a second polarity (e.g., the ferrule assembly 114 in the second position) shown in FIG. 18D, the user removes the ferrule assembly 114 and the boot assembly 130 from the outer housing as shown in FIG. 18B. In this example, the ferrule assembly 114 and the boot assembly 130 move conjointly (e.g., the boot assembly and the ferrule assembly are operatively coupled together), although they may move independently from one another in other embodiments. After the ferrule assembly 114 and the boot assembly 130 are removed from the interior of the outer housing 112, the ferrule assembly and the boot assembly are turned over as shown in FIG. 18C. The ferrule assembly 114 and the boot assembly 130 are then inserted back into the outer housing 112, thereby placing the fiber optic connector in the second configuration (FIG. 18D). In the second configuration, the second ferrule 126 is disposed above the first ferrule 124. These steps for changing the polarity of fiber optic connector 110 are generally the same for the other fiber optic connectors described herein.

Referring to FIGS. 19-30C, another embodiment of the fiber optic connector according to the present disclosure is generally indicated by reference numeral 210. Fiber optic connector 210 is generally analogous to fiber optic connector 10 and, thus, for ease of comprehension, where similar, analogous or identical parts are used, reference numerals "200" units higher are employed. Accordingly, unless clearly stated or indicated otherwise, the above descriptions regarding fiber optic connector 10 also apply to fiber optic connector 210.

The fiber optic connector 210 of this embodiment is a reversible polarity fiber optic connector, like fiber optic connector 10. In this embodiment, the fiber optic connector 210 has an outer housing 212 having a different configuration than the outer housing 12 described above and a removable (e.g., releasable) boot assembly 230 having a different configuration than the boot assembly 30 described above. The outer housing 212 includes polarity keys 220.

Figure 22:
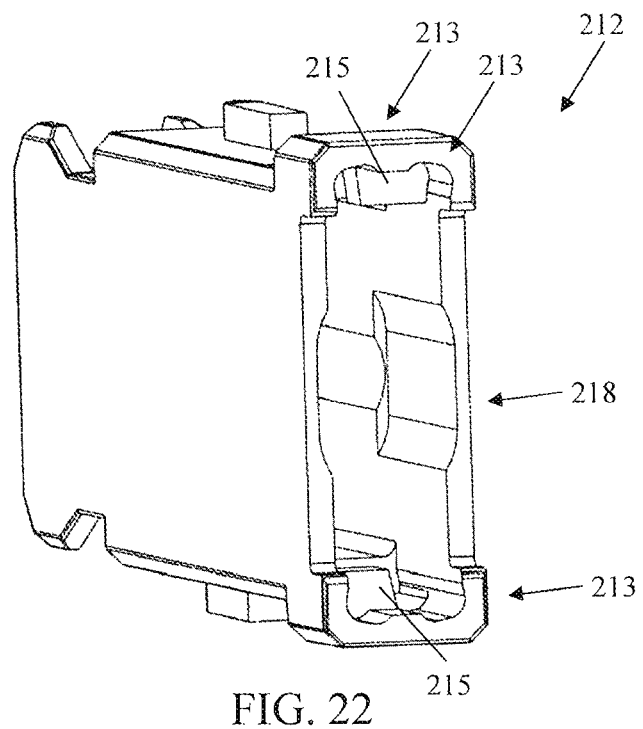
FIG. 22 is a rear perspective of an outer housing of the fiber optic connector of FIG. 19.
Figure 23:
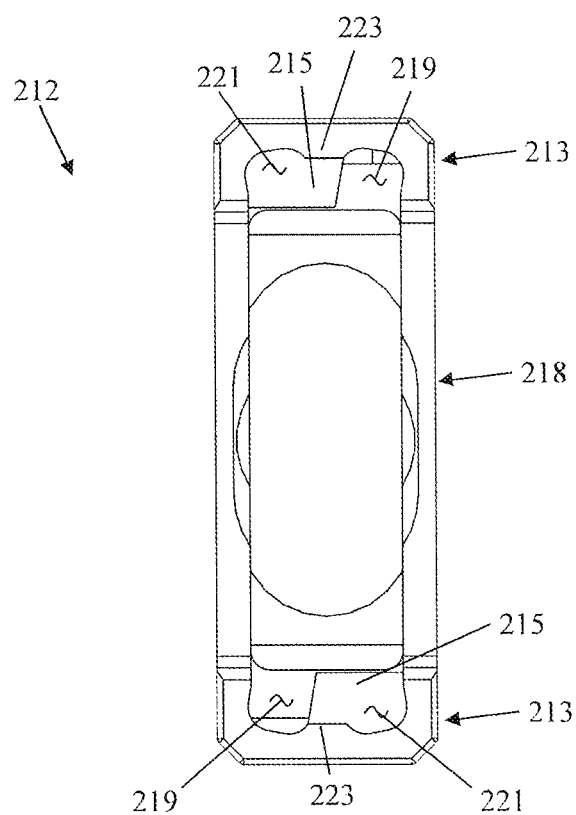
FIG. 23 is a rear view of the outer housing of the fiber optic connector of FIG. 19.
Figure 29:
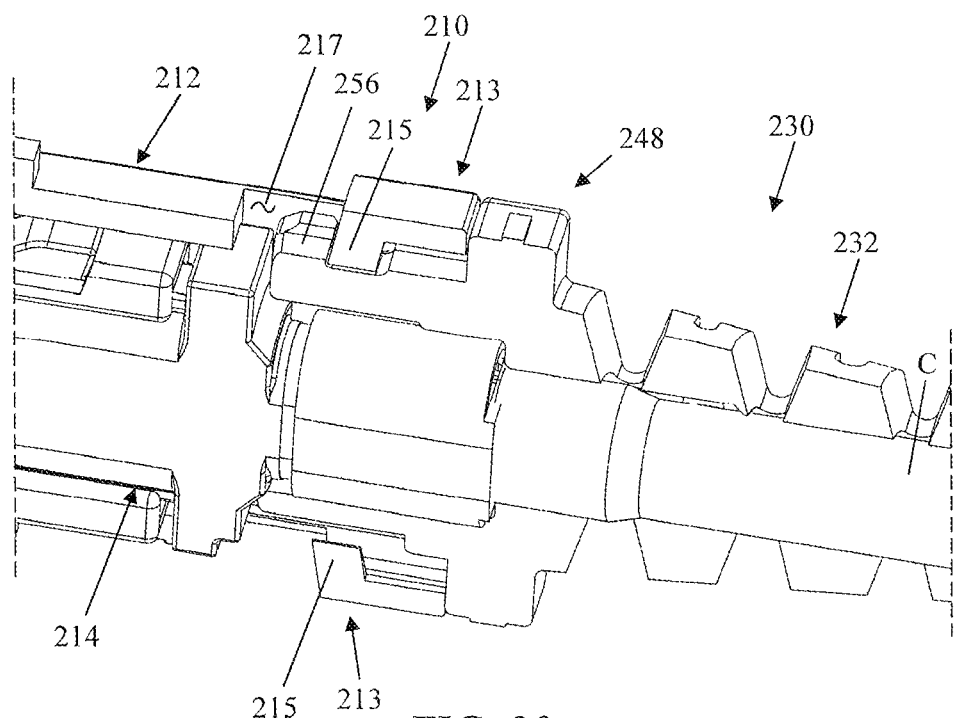
FIG. 29 is a perspective of the fiber optic connector of FIG. 19, with the boot assembly in the locked position and portions of the outer housing and boot assembly cut away to reveal interior details.
Figure 30:
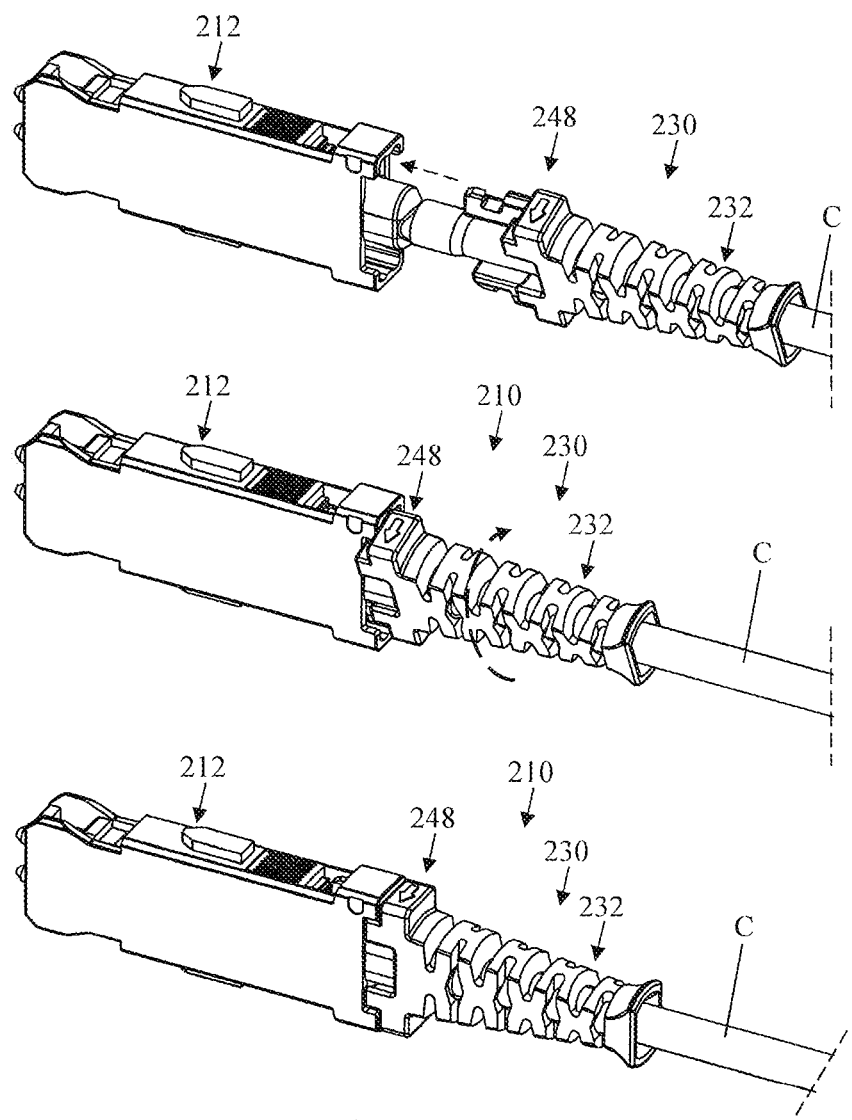
FIGS. 30A-C illustrate the steps of attaching the boot assembly to the outer housing to assemble the fiber optic connector of FIG. 19.
Figure 31:
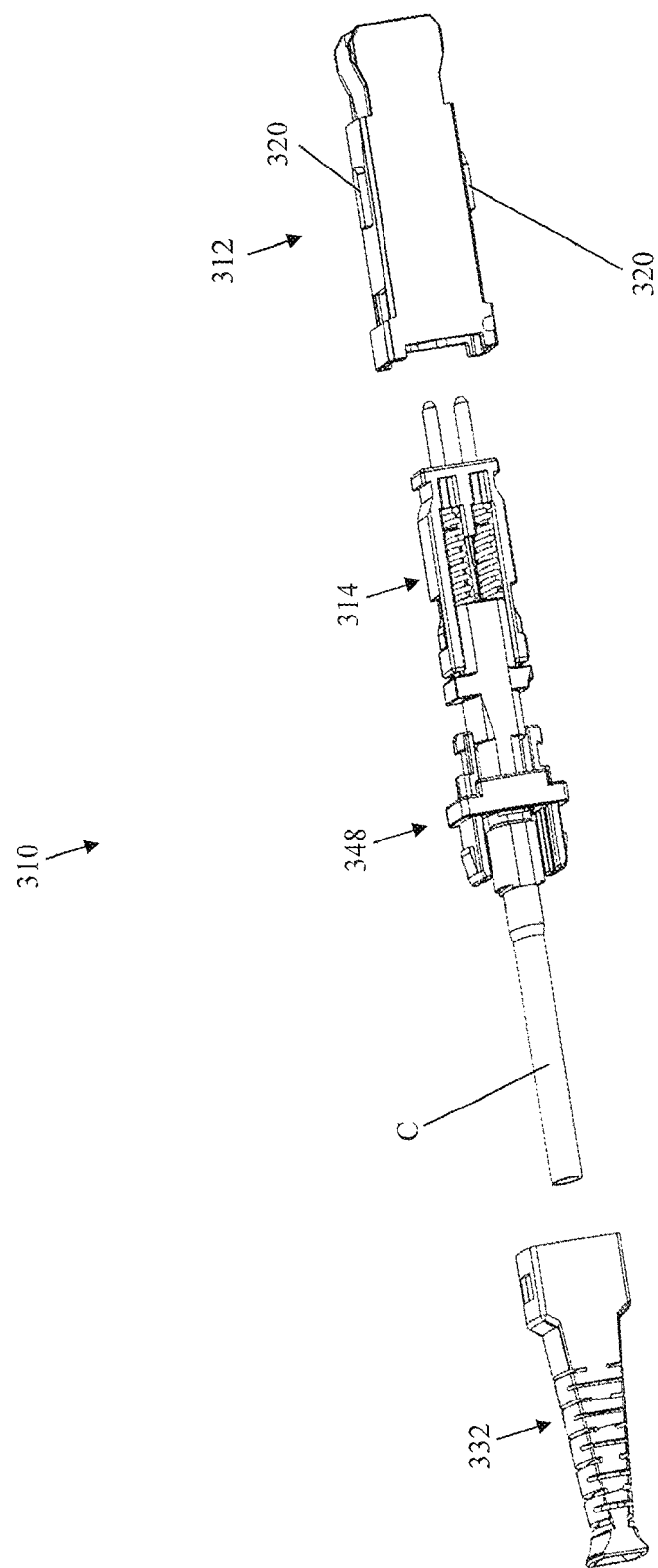
FIG. 31 is an exploded perspective of a fiber optic connector according to another embodiment of the present disclosure.
Figure 32:
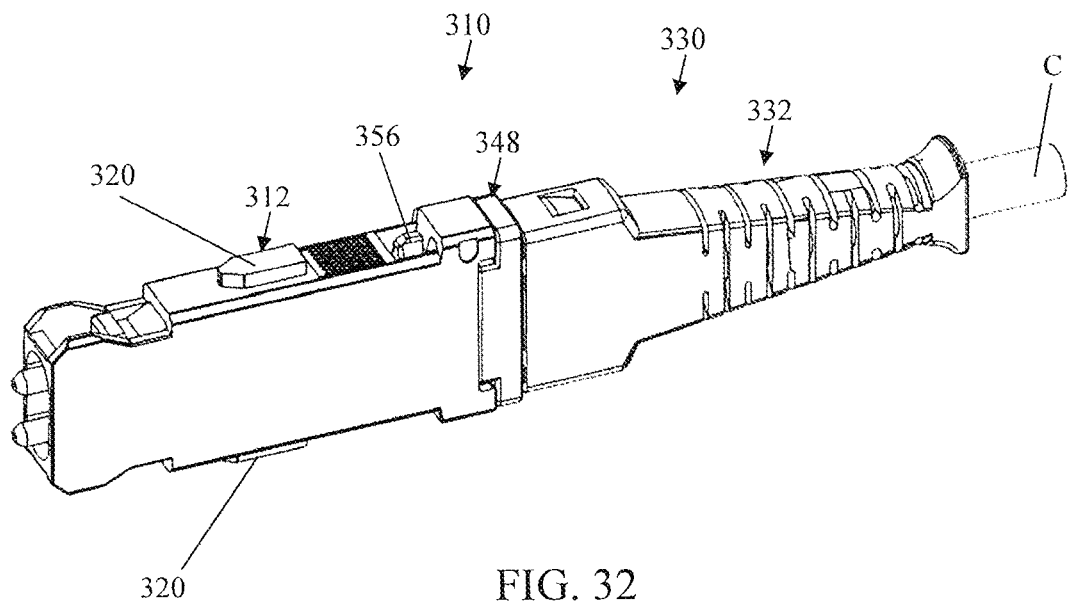
FIG. 32 is a perspective of the fiber optic connector of FIG. 31.
Figure 33:
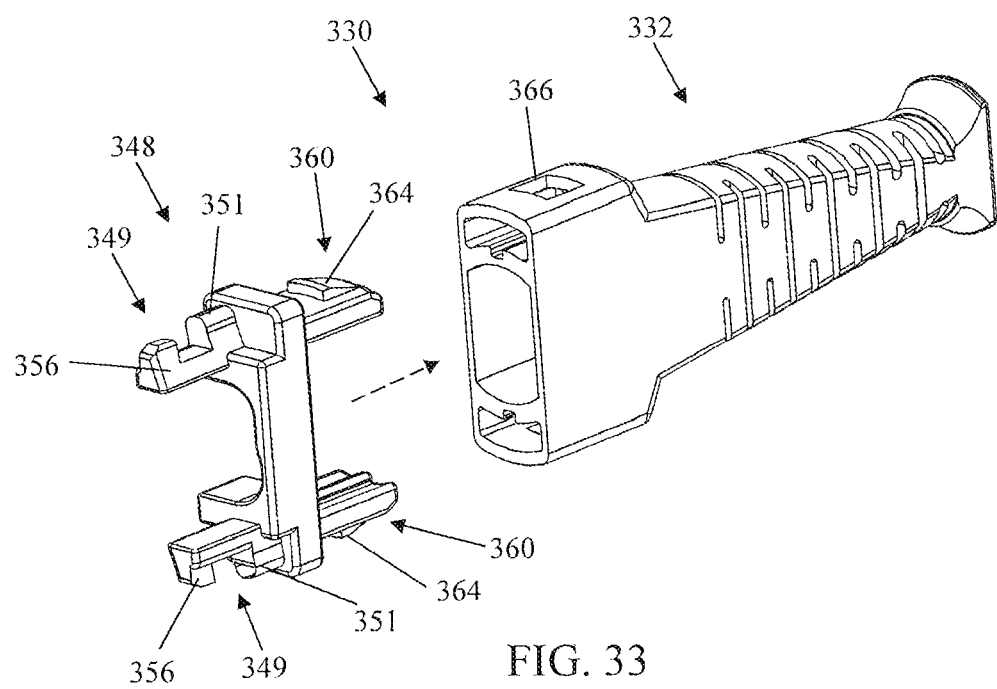
FIG. 33 is an exploded perspective of a boot assembly of the fiber optic connector of FIG. 31.

Referring to FIGS. 22 and 23, in this embodiment, the outer housing 212 includes a boot assembly interface 213 configured to connect of the boot assembly 230 to the outer housing. The interface 213 is adjacent the rear end 218 of the outer housing 212. The interface 213 includes a rear wall 215. As explained in more detail below, the boot assembly 230 engages the rear wall 215 (e.g., a front surface thereof)

to secure the boot assembly to the outer housing 212. The interface 213 also includes a recess or opening 217. The recess 217 is at least partially defined by the rear wall 215 (FIG. 29). The recess 217 is forward of the rear wall 215. The interface 213 also comprises a channel 219. The channel 219 is generally parallel to the central axis CA. One end (e.g., a front end) of the channel 219 opens into the recess 217 and the other, opposite end (e.g., rear end) of the channel is open to the rear of the outer housing 212. The channel 219 extends through the rear wall 215 from the rear end to the recess 217. The interface 213 also comprises (e.g., defines) a snap-fit recess 221. The snap-fit recess 221 is adjacent a side of the outer housing 212 that is opposite the side to which the channel 219 is adjacent. The interface 213 includes a rib 223 disposed between (e.g., separating) the channel 219 and the snap-fit recess 221. The interface 213 is integrally formed with the outer housing 212. In the illustrated embodiment, the outer housing 212 includes two boot assembly interfaces 213. The two interfaces 213 are generally disposed on opposite (top and bottom) sides of the outer housing 212. The two interfaces 213 are generally identical in structure and operation.

Figure 24:
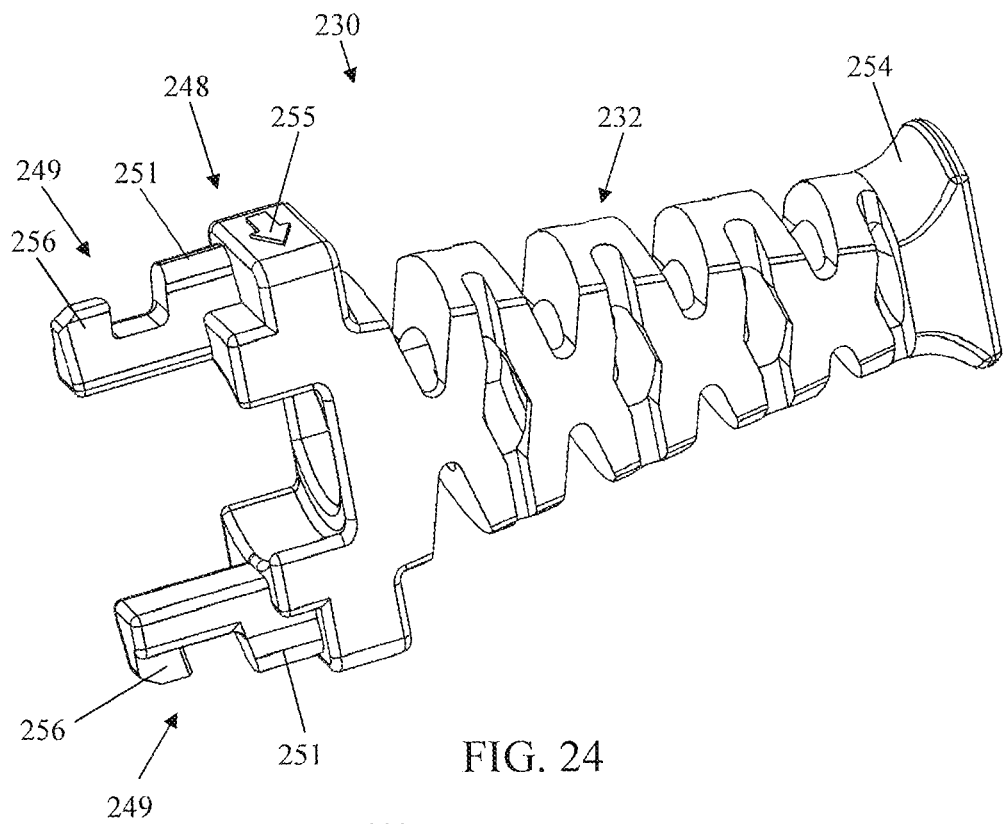
FIG. 24 is a perspective of the boot assembly of the fiber optic connector of FIG. 19.
Figure 25:
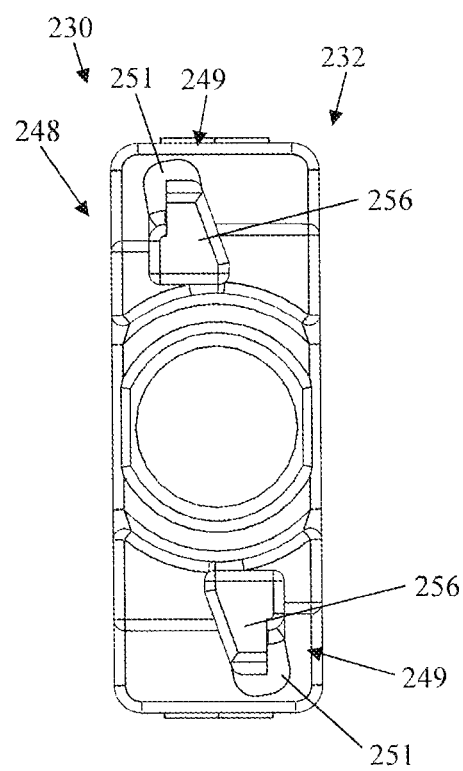
FIG. 25 is a front view of the boot assembly of the fiber optic connector of FIG. 19.
Figure 26:
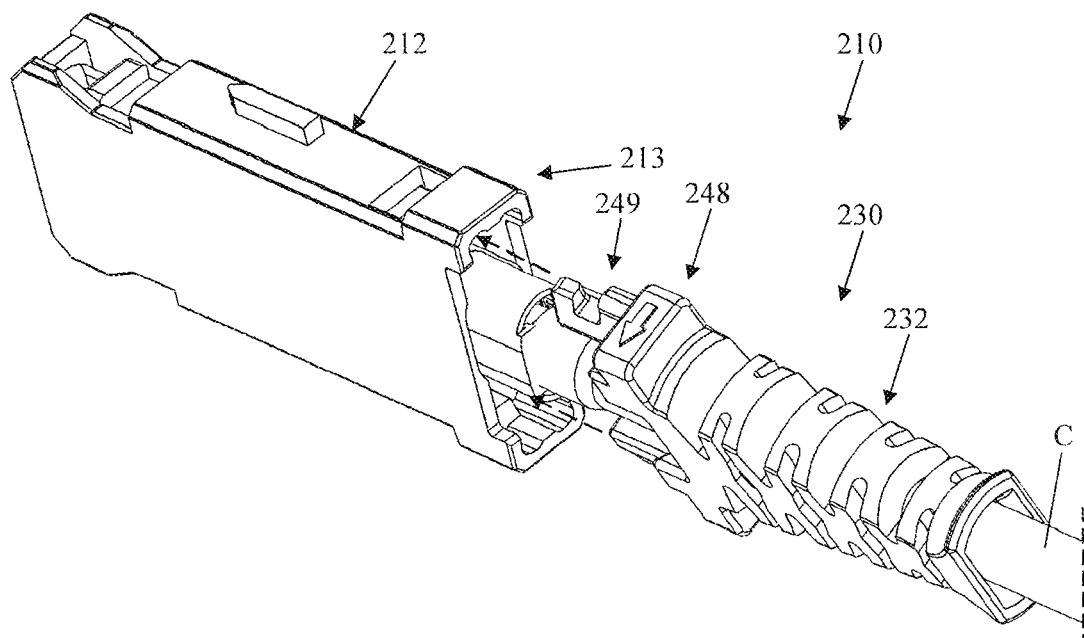
FIG. 26 is a perspective of the boot assembly being coupled to the outer housing to assemble the fiber optic connector of FIG. 19.
Figure 27:
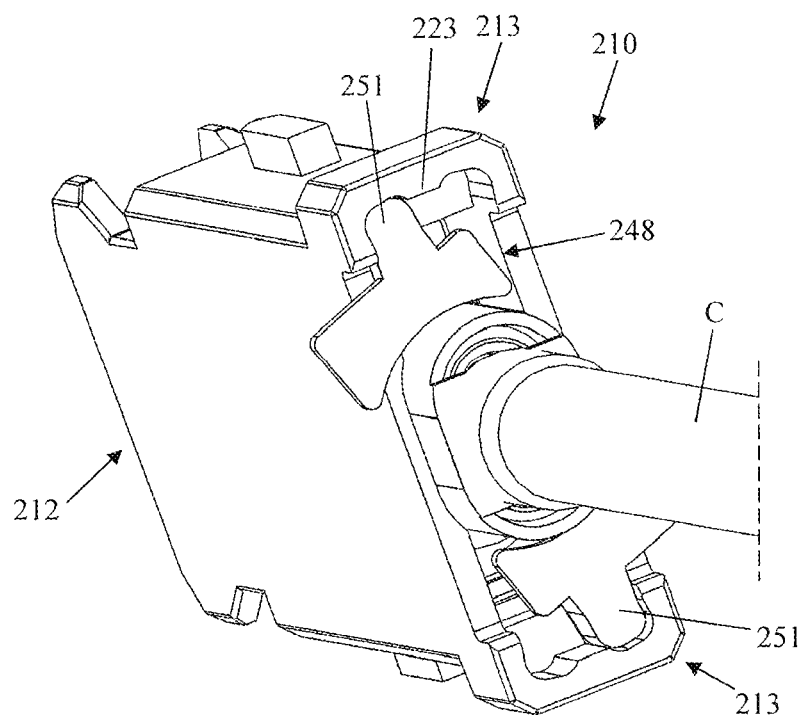
FIG. 27 is a rear perspective of the fiber optic connector of FIG. 19, with the boot assembly in the release position and shown in schematic cross section to reveal interior details.
Figure 28:
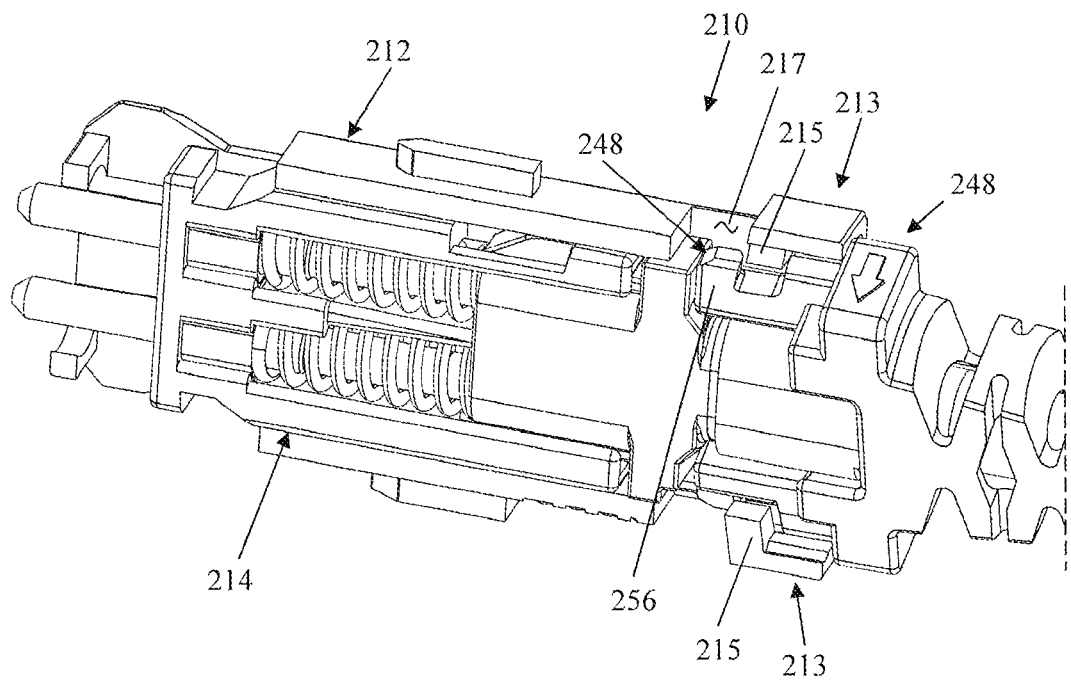
FIG. 28 is a fragmentary perspective of the fiber optic connector of FIG. 19, with a portion of the outer housing cut away to reveal interior details.

Referring to FIGS. 24 and 25, the boot assembly 230 includes a strain relief boot 232. The strain relief boot 232 is connected to the outer housing 212. Specifically, the strain relief boot 232 is releasably coupled to the outer housing 212. The strain relief boot 232 is inserted into the rear end 218 of the outer housing 212 to attach the strain relief boot (broadly, boot assembly 230) to the outer housing. When the strain relief boot 232 is attached to the outer housing 212, the strain relief boot secures the ferrule assembly 214 in the interior of the outer housing. The strain relief boot 232 generally closes off the rear end 218 of the outer housing 212, thereby securing the ferrule assembly 214 in the outer housing.

The boot assembly 230 further includes a rotor 248. The rotor connects the strain relief boot 232 to the outer housing 212. In this embodiment, the rotor 248 includes a connector 249 configured to connect to the outer housing 212. The connector 249 is configured to engage the interface 213 of the outer housing 212 to connect the boot assembly 230 to the outer housing. The connector 249 of the rotor 248 includes a blocking portion 256. In this embodiment, the blocking portion 256 comprises a protrusion. In particular, the protrusion of the blocking portion 256 comprises a hook. The hook of the blocking portion 256 is configured to engage the outer housing 212 (e.g., rear wall 215) to secure the boot assembly 230 to the outer housing. The channel 219 of the outer housing 212 is sized and shaped to permit the blocking portion 256 to move therethrough. Thus, the blocking portion 256 can move into the recess 217 of the outer housing 212 by moving forward into and through the channel 219 from the rear end 218 of the outer housing. Likewise, the blocking portion 256 can move away from or out of the outer housing 212 (e.g., out of the recess 217) by moving rearward into and through the channel 219 and out the rear end 218. As will become apparent, movement of the blocking portion 256 through the channel 219 allows the boot assembly 230 to be connected and disconnected from the outer housing 212.

The rotor 248 (broadly, the strain relief boot 232 or the boot assembly 230) is movable between a locked position (FIGS. 20, 29, 30C) and a release position (FIGS. 21, 27, 28, and 30B). Specifically, the rotor 248 is rotatable between the locked position and the release position. The blocking portion 256 is configured to block disconnection of the boot assembly 230 with the outer housing 112 in the locked position. In the locked position, the blocking portion 156 is disposed or arranged to inhibit the boot assembly 230 from uncoupling with the outer housing 212. Specifically, in the locked position (FIGS. 20, 29, 30C), the protrusion of the blocking portion 256 engages the outer housing 212 to secure the boot assembly 230 to the outer housing. The protrusion of the blocking portion 256 is engageable with the rear wall 215 (e.g., the front surface thereof) to block disconnection of the boot assembly 230 with the outer housing 212 along the connection axis CA in the locked position of the rotor. In particular, the blocking portion 256 is longitudinally aligned (e.g., axially aligned) with the rear wall 214 such that any reward movement of the strain relief boot 232 results in the protrusion (e.g., hook) of the blocking portion contacting the rear wall. The blocking portion 256 of the rotor 248 is arranged with respect to the interface 213 so that the blocking portion is disposed for engagement with the rear wall 215 to prevent the rearward movement of the rotor.

The blocking portion 256 is configured to permit disconnection of the boot assembly 230 with the outer housing 212 in the release position (FIGS. 21, 27, 28, and 30B). In the release position, the blocking portion 256 is disposed or arranged to permit the uncoupling of the boot assembly 230 from the outer housing 212. In the release position, the protrusion of the blocking portion 256 is detached from the outer housing 212 (e.g., rear wall 215) to permit the boot assembly 230 (and therefore the ferrule assembly 214) to be separated from the outer housing. Specifically, the blocking portion 256 is longitudinally aligned (e.g., axially aligned) with the channel 219 of the outer housing 212 such that the blocking portion can move into and through the channel. In the release position, the blocking portion 256 can move rearward out of the recess 217, into and through the channel 219, out of the outer housing 212. The protrusion of the strain relief boot 232 is aligned with the channel 219 in the release position of the rotor 248, and is moveable out of the recess 217 through the channel upon movement of the boot assembly 230 out of the outer housing 212 along the connection axis.

In the illustrated embodiment, the connector 249 of the rotor 248 includes a snap-fit connector 251. The snap-fit connector 251 is configured to form a snap-fit connection with the outer housing 212 when the rotor 248 is in the locked position to secure the boot assembly in the locked position. In the illustrated embodiment, the snap-fit connector 251 comprises a projection or rib having a rounded outer edge. The projection of the snap-fit connector 251 is sized and shaped to be received in the snap-fit recess 221 when the boot assembly 230 is in the locked position. To form the snap-fit connection, the boot assembly 230 is moved (e.g., rotated) from the release position to the locked position. As the rotor 248 is rotated in a first direction, the snap-fit connector 251 moves past the rib 223 and into the snap-fit recess 221. One or both of the rib 223 and the snap-fit connector 251 can be reliantly deformable to permit the snap-fit connector to move past the rib with the application of a sufficient amount of manual force. As the rotor 248 rotates to the locked position, the rib 223 and/or snap-fit connector 251 deflect or deform. Once the snap-fit connector 251 is in the snap-fit recess 221, the rib 223 and/or snap-fit connector return or snap-back to their undeformed state, securing the boot assembly 230 in the locked position. Engagement of the snap-fit connector 251 with the sides of the outer housing 212 defining the snap-fit recess 221 generally inhibits the boot assembly 230 (e.g., rotor 248) from unintentionally moving out of the locked position (e.g., into the release position).

To move the boot assembly 230 into the release position from the locked position, the boot assembly 230 (including rotor 248) is rotated in a second direction, generally opposite the first direction, until the snap-fit connector 251 is disposed in the channel 219. Accordingly, the channel 219 is sized and shaped to receive the snap-fit connector 251 (broadly, the connector 249). The snap-fit connector 251 is disposed in a rearward portion of the channel 219 of the outer housing when the boot assembly 230 is in the release position. The snap-fit connector 251 can move into the channel 219 as the boot assembly 230 is moved in a forward direction (e.g., along the central axis CA) to couple the boot assembly to the outer housing 212 and can move out of the channel as the boot assembly is moved in a rearward direction (e.g., along the central axis) to disconnect the boot assembly from the outer housing.

In the illustrated embodiment, the rotor 248 includes two connectors 249 (e.g., two blocking portions 256), one for each interface 213 of the outer housing 212. The two connectors 249 of the strain relief boot 232 are disposed on generally opposite sides of the strain relief boot. The two connectors 249 are generally identical in structure and operation.

After the ferrule assembly 214 is placed in the outer housing 212 to achieve the desired polarity, the ferrule assembly is retained in the outer housing by the boot assembly 230. Referring to FIGS. 30A-C, to connect the strain relief boot 232 (broadly, the boot assembly 230) to the outer housing 212, the user aligns the rotor 248 with the outer housing so that the connectors 249 are aligned with the channels 219 of the interfaces 213 (FIG. 30A). After the connectors 249 are aligned with the channels 219, the user moves (e.g., inserts) the boot assembly 230 forward, into the rear end 218 of the outer housing 212. As the rotor 248 of the boot assembly 230 is inserted into the outer housing 212, the blocking portions 256 move into and through the channels 219. Likewise, the snap-fit connector 251 moves into the channel 219 (broadly, the connector 249 moves into the channel). The rotor 248 (e.g., surfaces thereof) may engage the rear end 218 of the outer housing 212 to limit the forward movement of boot assembly 230 and positon the boot assembly in the release position (FIG. 30B). After the boot assembly 230 is in the release position, the boot assembly (e.g., rotor 248) is rotated (FIG. 30B) to the locked position (FIG. 30C). The user applies a sufficient amount of manual force to move the snap fit connectors 251 from the channel 219, past the rib 223 and into the snap-fit recess 221. The snap-fit connectors 251 secure the boot assembly 230 in the locked position.

To disconnect the strain relief boot 232 (broadly, the boot assembly 230) from the outer housing 212, the user rotates the strain relief boot (e.g., rotor 248) from to the locked position to the release position. The user applies a sufficient amount of manual force to move the snap fit connectors 251 from the snap-fit recess 221, past the rib 223 and into the channel 219. The strain relief boot 232 may include indicia 255 (FIG. 24) indicating the direction of movement (e.g., direction of rotation) the user needs to move the strain relief boot to disconnect the strain relief boot. In the illustrated embodiment, the indicia 255 is an arrow pointing in the direction of movement. After the boot assembly 230 is in the release position, the user may then pull the boot assembly in a rearward direction relative to the outer housing 212. The boot assembly 230 is moved rearward until it separates from the outer housing 212, thereby allowing the ferrule assembly 214 to be removed from the outer housing to change the polarity of the fiber optic connector 210.

Referring to FIGS. 31-35, another embodiment of the fiber optic connector according to the present disclosure is generally indicated by reference numeral 310. Fiber optic connector 310 is generally analogous to fiber optic connector 210 and, thus, for ease of comprehension, where similar, analogous or identical parts are used, reference numerals "100" units higher are employed. Accordingly, unless clearly stated or indicated otherwise, the above descriptions regarding fiber optic connector 210 also apply to fiber optic connector 310. The fiber optic connector 310 has an outer housing 312 having alignment keys 320.

The fiber optic connector 310 of this embodiment is a reversible polarity fiber optic connector, like fiber optic connector 210. In this embodiment, the fiber optic connector 310 has a boot assembly 330 having a different configuration than the boot assembly 230 described above. The boot assembly 330 includes a strain relief boot 332 and a rotor 348. In this embodiment, the rotor 348 is a separate piece from the strain relief boot 332. In other words, the rotor 348 is not integrally formed with (e.g., as one piece with) the strain relief boot 332.

Figure 34:
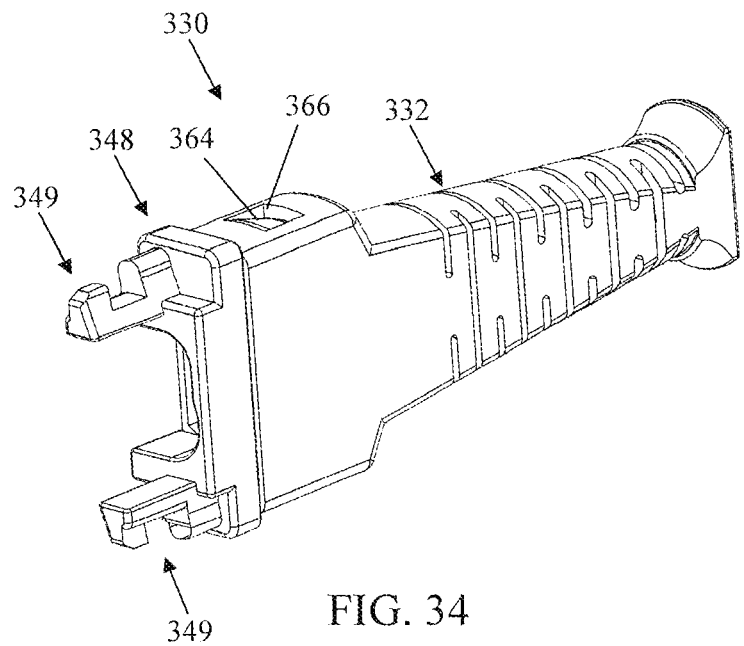
FIG. 34 is a perspective of the boot assembly of the fiber optic connector of FIG. 31.
Figure 35:
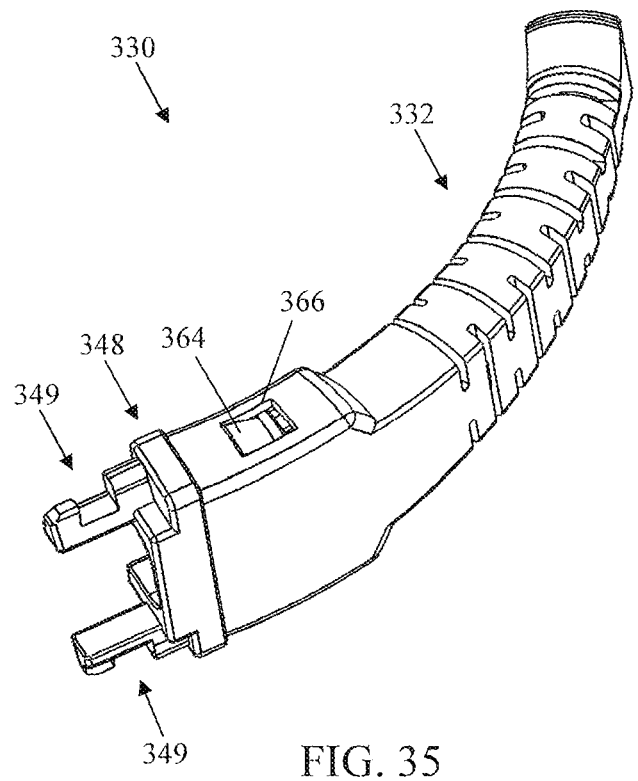
FIG. 35 is a perspective of the boot assembly of the fiber optic connector of FIG. 31, illustrating deflection of the strain relief boot.

The rotor 348 is attachable (e.g., releasably attachable) to the strain relief boot. Preferably, the connectors 349 (e.g., protrusions or hooks) of the rotor 348 are releasably coupled to the strain relief boot 332. The rotor 348 includes a latch 360 configured to connect the rotor to the strain relief boot 332. The latch 360 is resiliently deflectable. The latch 360 is engageable with the strain relief boot 332 to connect the rotor 348 to the strain relief boot. In the illustrated embodiment, the latch 360 is engageable with the strain relief boot 332 adjacent the front end of the strain relief boot. The latch 360 includes a tab or catch 364 positioned for engaging the strain relief boot 332. Specifically, the strain relief boot 332 includes (e.g., defines) a recess or opening 366 sized and shaped to receive the tab 364 of the latch 360. The tab 364 engages an edge of the opening 366 to secure the rotor 348 to the strain relief boot 332 (FIGS. 34 and 35). To attach the rotor 348 to the strain relief boot 332, the rotor 348 is inserted into the front end of the strain relief boot. As the rotor 348 is inserted, a ramp surface of the latch 360 engages the strain relief boot 332, thereby deflecting the latch. Once the tab 354 of the latch 360 becomes aligned with the opening 366 in the strain relief boot 332, the latch returns or snaps-back to its undeformed position, thereby securing the rotor 348 to the strain relief boot. In the illustrated embodiment, the rotor 348 includes two latches 360 on opposite sides of the rotor. The two latches 360 are generally identical (e.g., are mirror images of one another). Likewise, the strain relief boot 332 includes two openings 366 on generally opposite sides of the strain relief boot, one opening for each latch 360 of the rotor 348. Except for the rotor 348 being formed separately from the strain relief boot 332, the fiber optic connector 310 works in the same way as the fiber optic connector 210. By making the boot 332 separate from the rotor 348 is easier to make the boot from a softer and more flexible material. This permits the boot to readily flex with the cable (as illustrated in FIG. 35). At the same time, the rotor 348 can be made of a harder material to resist wear and positively locate the ferrule assembly 312 and boot assembly 330 in the outer housing 312.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A reversible polarity fiber optic connector comprising:
an outer housing having a front end and a rear end separated along a connection axis, the outer housing including a polarity key configured for engaging a fiber optic receptacle to permit coupling of the outer housing in only one orientation with respect to the fiber optic receptacle, the outer housing having an interior;
a ferrule assembly including a front body, a first ferrule and a second ferrule, the first and second ferrules being supported by the front body, the ferrule assembly being configured for mating reception in the interior of the outer housing in a first position corresponding to a first polarity of the fiber optic connector and in a second position corresponding to a second polarity of the fiber optic connector, the first and second ferrules projecting from the front end of the outer housing in both the first and second positions, the ferrule assembly being configured to form an optical connection with the fiber optic receptacle; and
a boot assembly releasably connected to the outer housing to enable the ferrule assembly to be inserted into the interior of the outer housing along the connection axis and to enable the ferrule assembly to be removed from the interior of the outer housing along the connection axis when the boot assembly is disconnected from the outer housing, the boot assembly configured to receive a cable, the boot assembly including a rotor operatively connected to the outer housing for rotation with respect to the outer housing about the connection axis between a locked positon and a release position, the rotor including a blocking portion, the blocking portion being configured to block disconnection of the boot assembly with the outer housing in the locked position, and configured to permit disconnection of the boot assembly with the outer housing in the release position.

2. The reversible polarity fiber optic connector of claim 1, wherein the rotor is configured to rotate 90° or less between the locked position and the release position.

3. The reversible polarity fiber optic connector of claim 2, further comprising a deflectable latch associated with the boot assembly, the deflectable latch being engageable with the outer housing to prevent disconnection of the boot assembly with the outer housing, and deflectable out of engagement with the outer housing to permit disconnection of the boot assembly with the outer housing.

4. The reversible polarity fiber optic connector of claim 3, wherein the blocking portion of the rotor is arranged with respect to the deflectable latch so that in the locked position of the rotor the blocking portion is disposed for engagement with the deflectable latch to prevent the deflectable latch from being deflected, and in the release position the blocking portion is out of the way of the deflectable latch to permit deflection of the deflectable latch.

5. The reversible polarity fiber optic connector of claim 4, wherein the deflectable latch is engageable with the outer housing adjacent the rear end of the outer housing.

6. The reversible polarity fiber optic connector of claim 5, wherein the outer housing and the ferrule assembly are free of mechanical connection to one another.

7. The reversible polarity fiber optic connector of claim 4, wherein the boot assembly includes a locking device connected to the outer housing, the locking device including the deflectable latch and a stator mounting the rotor of the boot assembly on the locking device.

8. The reversible polarity fiber optic connector of claim 7, wherein the stator is configured to limit rotation of the rotor relative to the locking device to 45° or less between the locked position and the release position.

9. The reversible polarity fiber optic connector of claim 7, wherein the deflectable latch includes a tab positioned for engaging the outer housing and a finger tab positioned to be engaged for deflecting the deflectable latch and moving the tab out of position to engage the outer housing.

10. The reversible polarity fiber optic connector of claim 4, wherein the boot assembly comprises a strain relief boot constructed to receive the cable therethrough, the strain relief boot including the deflectable latch and defining a cavity adjacent the deflectable latch, the rotor being located in the cavity and being rotatable with respect to the strain relief boot.

11. The reversible polarity fiber optic connector of claim 10, wherein the rotor has a non-circular cross section.

12. The reversible polarity fiber optic connector of claim 11, wherein the rotor comprises flat portions on opposite sides of the rotor and opposite arcuate portions disposed between and interconnecting the flat portions, the arcuate portions being in registration with the deflectable latch in the locked position and the flat portions being in registration with the deflectable latch in the release position.

13. The reversible polarity fiber optic connector of claim 1, wherein the boot assembly includes a strain relief boot configured to receive the cable therethrough, the strain relief boot including the rotor.

14. The reversible polarity fiber optic connector of claim 13, wherein the blocking portion of the rotor comprises a protrusion.

15. The reversible polarity fiber optic connector of claim 14, further comprising a deflectable latch associated with the boot assembly, the deflectable latch being engageable with the outer housing to prevent disconnection of the boot assembly with the outer housing, and deflectable out of engagement with the outer housing to permit disconnection of the boot assembly with the outer housing, the protrusion of the strain relief boot being disposed to block deflection of the deflectable latch in the locked position of the rotor.

16. The reversible polarity fiber optic connector of claim 13, wherein the outer housing comprises a rear wall, the protrusion of the strain relief boot being engageable with the rear wall to block disconnection of the boot assembly with the outer housing along the connection axis in the locked position of the rotor.

17. The reversible polarity fiber optic connector of claim 16, wherein the outer housing comprises a recess defined by the rear wall and a channel opening at one end into the recess and opening at an opposite end to the rear of the outer housing, the protrusion of the strain relief boot being aligned with the channel in the release position of the rotor, and moveable out of the recess through the channel upon movement of the boot assembly out of the outer housing along the connection axis.

\* \* \* \* \*